United States Patent
Asajima et al.

(10) Patent No.: US 8,368,768 B2
(45) Date of Patent: Feb. 5, 2013

(54) IMAGE PROCESSING APPARATUS, IMAGE PROCESSING METHOD, AND PROGRAM

(75) Inventors: Shuichi Asajima, Tokyo (JP); Ryota Kosakai, Tokyo (JP); Takahide Otani, Tokyo (JP)

(73) Assignee: Sony Corporation, Tokyo (JP)

( * ) Notice: Subject to any disclaimer, the term of this patent is extended or adjusted under 35 U.S.C. 154(b) by 347 days.

(21) Appl. No.: 12/784,989

(22) Filed: May 21, 2010

(65) Prior Publication Data
US 2010/0302402 A1 Dec. 2, 2010

(30) Foreign Application Priority Data
Jun. 2, 2009 (JP) .................................. 2009-133404

(51) Int. Cl.
*H04N 5/225* (2006.01)
(52) U.S. Cl. ..................................................... 348/218.1
(58) Field of Classification Search .................... 348/47, 348/139, 218.1; 382/103; 345/619
See application file for complete search history.

(56) References Cited

U.S. PATENT DOCUMENTS

| | | | | |
|---|---|---|---|---|
| 5,613,048 | A * | 3/1997 | Chen et al. ..................... | 345/419 |
| 5,926,190 | A * | 7/1999 | Turkowski et al. ............ | 345/473 |
| 6,795,090 | B2 * | 9/2004 | Cahill et al. ................... | 345/646 |
| 7,085,409 | B2 * | 8/2006 | Sawhney et al. .............. | 382/154 |
| 7,576,742 | B2 * | 8/2009 | Kanematsu et al. ........... | 345/427 |
| 2002/0171666 | A1 * | 11/2002 | Endo et al. ..................... | 345/619 |
| 2008/0049100 | A1 * | 2/2008 | Lipton et al. ..................... | 348/43 |
| 2010/0259539 | A1 * | 10/2010 | Papanikolopoulos et al. ............................. | 345/420 |

FOREIGN PATENT DOCUMENTS

| | | |
|---|---|---|
| JP | 11-504167 | 4/1999 |
| JP | 2005-94073 | 4/2005 |
| JP | 2006-140618 | 6/2006 |

OTHER PUBLICATIONS

European Search Report issued Sep. 14, 2011, in Patent Application No. 10163907.8.
Steven M. Seitz et al. "View Morphing", Computer Graphics Proceedings, Annual Conference Series, XP682718, Aug. 4, 1996, pp. 21-30.
Azzedine Boukerche et al. "A 3D Image-Based Rendering Technique for Mobile Handheld Devices", Proceedings of the 2006 International Symposium on a World of Wireless, Mobile and Multimedia, XP010925879, Jun. 26, 2006, 7 Pages.

(Continued)

*Primary Examiner* — Aung S Moe
*Assistant Examiner* — Amy Hsu
(74) *Attorney, Agent, or Firm* — Oblon, Spivak, McClelland, Maier & Neustadt, L.L.P.

(57) ABSTRACT

An image processing apparatus includes: a straight edge detection section that detects a straight edge of an object in at least one of first and second original images obtained by capturing the identical object from two different viewpoints; a first morphing processing section that performs a first morphing process, which does not include parallelization of the original images, on the original images to generate a first intermediate image seen from a virtual viewpoint between the two viewpoints; a distortion determination section that determines whether or not an edge of the object in the first intermediate image that corresponds to the straight edge detected by the straight edge detection section is distorted; and a second morphing processing section that, if the edge is distorted, performs a second morphing process, which includes parallelization of the original images, on the original images to generate a second intermediate image seen from the virtual viewpoint.

4 Claims, 17 Drawing Sheets

OTHER PUBLICATIONS

Heung-Yeung Shum et al. "A Review of Image-Based Rendering Techniques", Proceedings of SPIE, The International Society for Optical, Engineering SPIE, vol. 4067, XP002401068, Jan. 1, 2000, pp. 2-13.

Rahul Swaminathan et al. "A Perspective on Distortions", Proceedings of the 2003 IEEE Computer Society Conference on Computer Vision and Pettern Recognition, vol. 2, XP010644724, Jun. 18, 2003, 8 Pages.

Juan Torres et al. "A Practical Algorithm to Correct Geometrical Distortion of Image Acquisition Cameras", 2004 International Conference on Image Processing, vol. 4, XP010786283, Oct. 24, 2004, pp. 2451-2454.

* cited by examiner

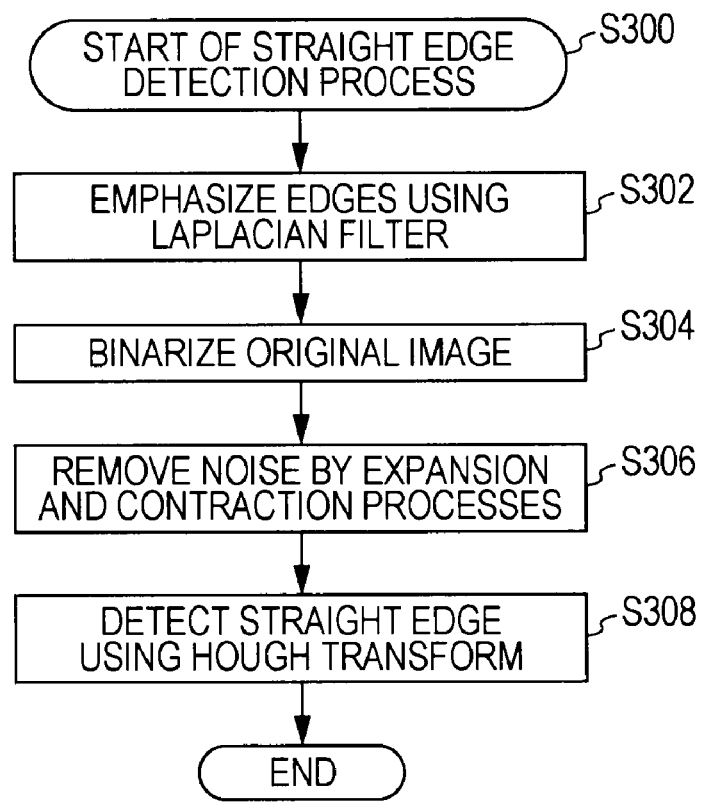

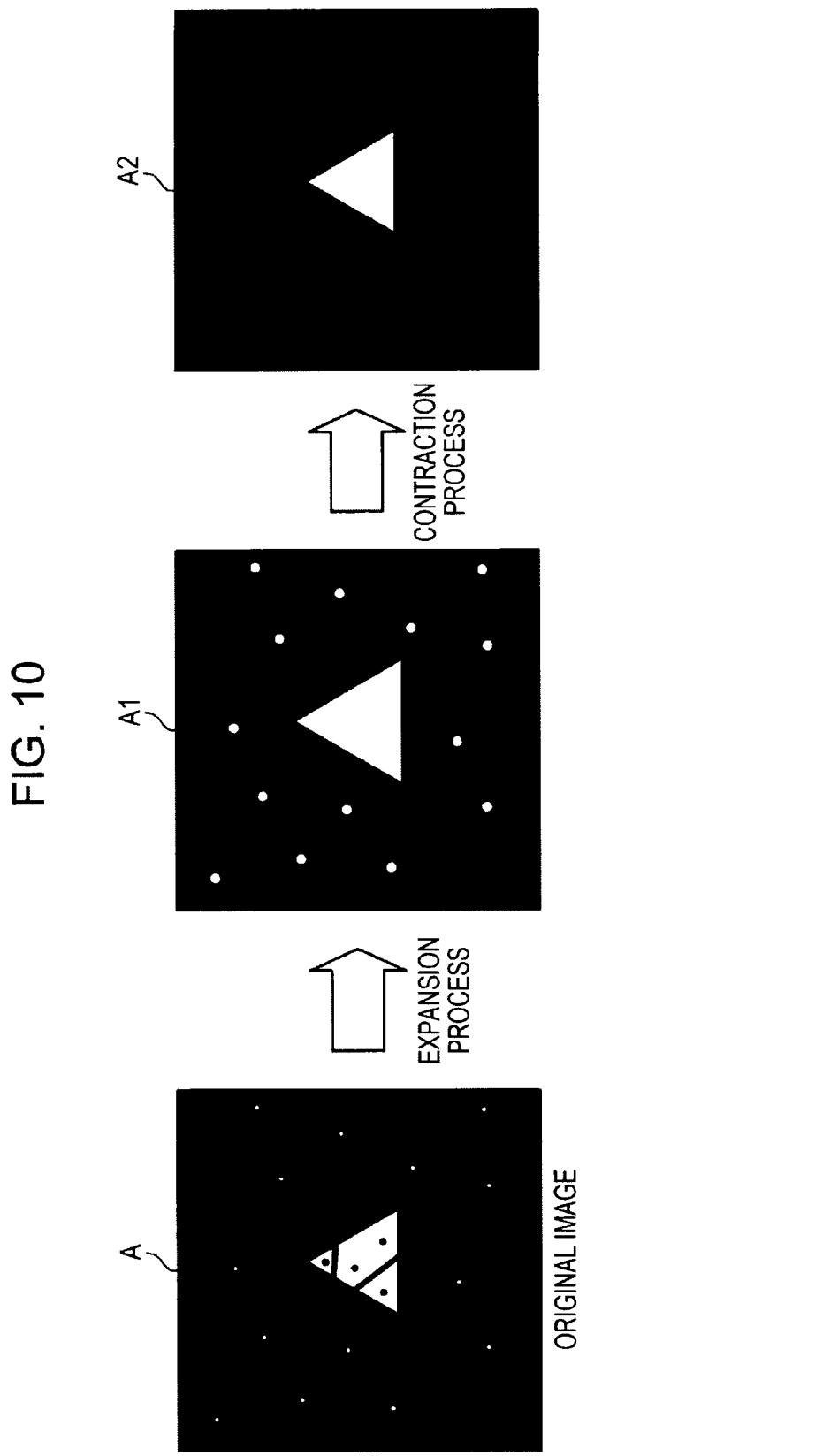

IMAGE PROCESSING APPARATUS, IMAGE PROCESSING METHOD, AND PROGRAM

BACKGROUND OF THE INVENTION

1. Field of the Invention

The present invention relates to an image processing apparatus, an image processing method, and a program.

2. Description of the Related Art

In recent years, services that integrate or synthesize a plurality of images to provide a three-dimensional representation of a space or an object such as a building have been widespread. These services allow users to view a generated three-dimensional model from various viewpoints, giving the users a sense of immersiveness to make them feel as if they were actually there. However, the computational cost of three-dimensional modeling that uses a plurality of images is high, and a large amount of data is necessary to generate a three-dimensional image itself or other images necessary to generate the three-dimensional image.

In contrast, morphing is an image processing technology for showing how an object gradually changes from one form into another. In the morphing, corresponding pixels in two two-dimensional images (original images) captured from two different viewpoints are linearly interpolated to generate an intermediate image (virtual image) seen from a desired virtual viewpoint between the two viewpoints. Thus, the morphing provides a visual effect as if the viewpoint was moving. According to the morphing, a plurality of intermediate images that would be seen when the viewpoint was moving are sequentially generated through calculation using the two photographed images. Thus, advantageously, the amount of data for images before and after the generation of the images may be significantly reduced.

In the case where morphing is performed using two original images obtained by capturing an object (subject) from two different viewpoints, however, intermediate images generated by the morphing may be distorted if the angle formed by the two viewpoints and the object is too large. In view of the above issue, view morphing (see Steven M. Seitz, Charles R. Dyer, "View Morphing", Proceedings of SIGGRAPH '96, pp. 21-31, 1996, for example), which is a morphing technique with consideration of camera geometry, may be used to generate more natural and distortion-free images as disclosed in Japanese Patent No. 3634677, for example. The camera geometry means relative positional relationship between the camera at one of the two viewpoints and the camera at the other.

SUMMARY OF THE INVENTION

Unlike normal morphing, however, the view morphing discussed above includes processes with a high computational cost, such as a matrix operation and a singular value decomposition, for consideration of camera geometry. Thus, the computational cost of the view morphing is higher than the computational cost of the normal morphing, and a morphing technique with a reduced computational cost has been desired. In the case where a morphing technology is implemented on electronic devices equipped with a processor with a low processing capacity (for example, portable devices such as digital cameras), in particular, it has been desired to reduce the number of executions of a process with a high computational cost, such as the view morphing, as much as possible.

In view of the foregoing, it is desirable to provide an image processing apparatus, an image processing method, and a program that generate a distortion-free intermediate image using two original images captured from different viewpoints with a reduced computational cost.

According to an embodiment of the present invention, there is provided an image processing apparatus including: a straight edge detection section that detects a straight edge of an object in at least one of first and second original images obtained by capturing the identical object from two different viewpoints; a first morphing processing section that performs a first morphing process, in which a parallelization process is not performed on the first and second original images, on the first and second original images to generate a first intermediate image seen from a virtual viewpoint between the two viewpoints; a distortion determination section that determines whether or not an edge of the object in the first intermediate image that corresponds to the straight edge detected by the straight edge detection section is distorted; and a second morphing processing section that, if the edge is distorted, performs a second morphing process, in which a parallelization process is performed on the first and second original images, on the first and second original images to generate a second intermediate image seen from the virtual viewpoint.

The straight edge detection section may binarize the at least one of the original images and perform expansion and contraction processes on the binarized image to detect the straight edge from the image that has been subjected to the expansion and contraction processes using a Hough transform.

The distortion determination section may determine that the edge in the first intermediate image is distorted if an area of an image region surrounded by the edge and a line segment connecting both ends of the edge is equal to or more than a threshold determined by a predetermined determination criterion constant.

The second morphing process may be a view morphing process.

The image processing apparatus may further include: a characteristic point extraction section that extracts a plurality of characteristic points from the first original image; and a corresponding point search section that searches the second original image to find a plurality of corresponding points that respectively correspond to the characteristic points, and the first and second morphing processing sections may perform the first and second morphing processes using the characteristic points and the corresponding points.

According to another embodiment of the present invention, there is provided an image processing method including the steps of: detecting a straight edge of an object in at least one of first and second original images obtained by capturing the identical object from two different viewpoints; performing a first morphing process, in which a parallelization process is not performed on the first and second original images, on the first and second original images to generate a first intermediate image seen from a virtual viewpoint between the two viewpoints; determining whether or not an edge of the object in the first intermediate image that corresponds to the straight edge detected in the straight edge detection step is distorted; and if the edge is distorted, performing a second morphing process, in which a parallelization process is performed on the first and second original images, on the first and second original images to generate a second intermediate image seen from the virtual viewpoint.

According to still another embodiment of the present invention, there is provided a program that causes a computer to execute the steps of: detecting a straight edge of an object in at least one of first and second original images obtained by capturing the identical object from two different viewpoints; performing a first morphing process, in which a parallelization process is not performed on the first and second original images, on the first and second original images to generate a first intermediate image seen from a virtual viewpoint between the two viewpoints; determining whether or not an edge of the object in the first intermediate image that corresponds to the straight edge detected in the straight edge detection step is distorted; and if the edge is distorted, performing a second morphing process, in which a parallelization process is performed on the first and second original images, on the first and second original images to generate a second intermediate image seen from the virtual viewpoint.

According to the above configuration, a straight edge of an object in at least one of first and second original images is detected, and a first morphing process, in which a parallelization process is not performed on the first and second original images, is performed on the first and second original images to generate a first intermediate image seen from a virtual viewpoint between two viewpoints. In addition, it is determined whether or not an edge in the first intermediate image that corresponds to the straight edge is distorted, and if the edge is distorted, a second morphing process, in which a parallelization process is performed on the first and second original images, is performed on the first and second original images to generate a second intermediate image seen from the virtual viewpoint. This makes it possible to suitably detect whether or not the first intermediate image generated by the first morphing process is distorted, and to perform a second morphing process to generate a distortion-free second intermediate image only if the first intermediate image is distorted.

According to the present invention described above, it is possible to generate a distortion-free intermediate image using two original images captured from different viewpoints with a reduced computational cost.

BRIEF DESCRIPTION OF THE DRAWINGS

FIG. 8 is a flowchart showing a straight edge detection process (S300) of FIG. 7;

FIG. 9 illustrates a Laplacian filter according to the embodiment;

FIG. 10 illustrates expansion and contraction processes according to the embodiment;

DESCRIPTION OF THE PREFERRED EMBODIMENTS

A preferred embodiment of the present invention will be described in detail below with reference to the accompanying drawings. In the specification and the drawings, constituent elements having substantially the same functional configuration are denoted by the same reference symbol to omit repeated descriptions.

The description will be made in the following order.
1. First Embodiment (Example in which Normal Morphing Is Performed before Distortion Detection)
  [1. Overview of Image Processing Method]
  [2. Configuration of Image Processing Apparatus]
  [3. Image Processing Method]
    [3.1. Characteristic Point Extraction Process and Corresponding Point Search Process]
    [3.2. Straight Line Edge Detection Process]
    [3.3. Normal Morphing Process (Color Image)]
    [3.4. Normal Morphing Process (Binary Image)]
    [3.5. Distortion Detection Process]
    [3.6. View Morphing Process]
  [4. Conclusion]
2. Second Embodiment (Example in which One of Normal Morphing and View Morphing Is Selectively Performed after Distortion Detection)

First Embodiment

[1. Overview of Image Processing Method]

Figure 1:
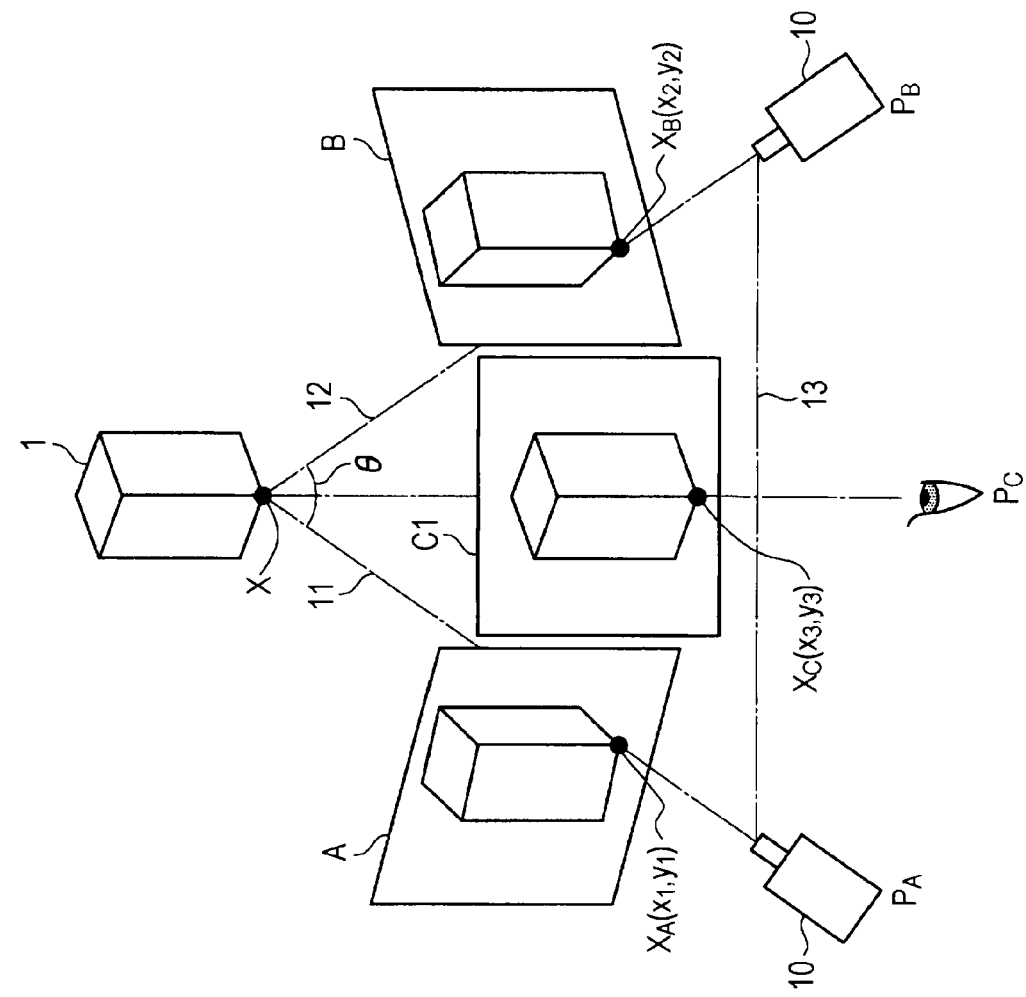
FIG. 1 shows the concept of a normal morphing process according to a first embodiment of the present invention.
Figure 2:
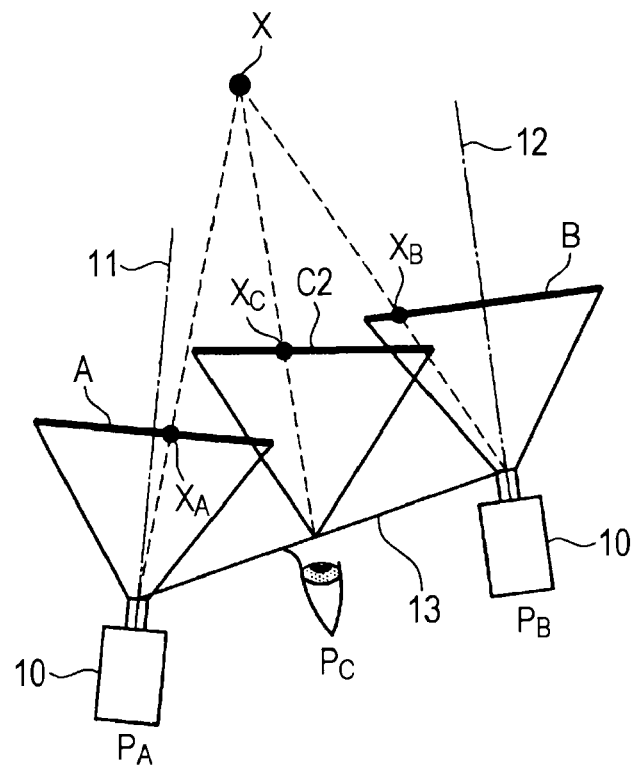
FIG. 2 shows the concept of a view morphing process according to the embodiment.
Figure 3:
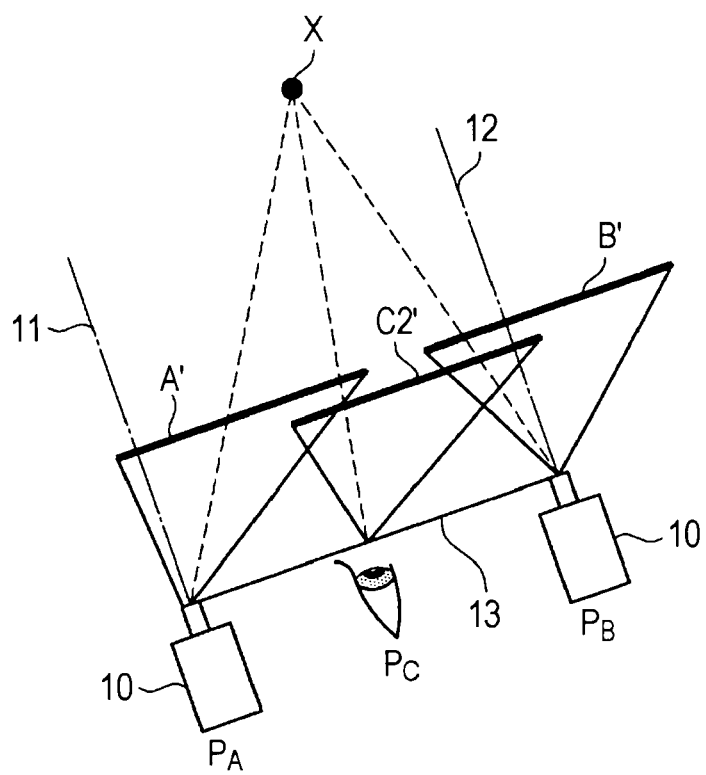
FIG. 3 shows the concept of the view morphing process according to the embodiment.
Figure 4:
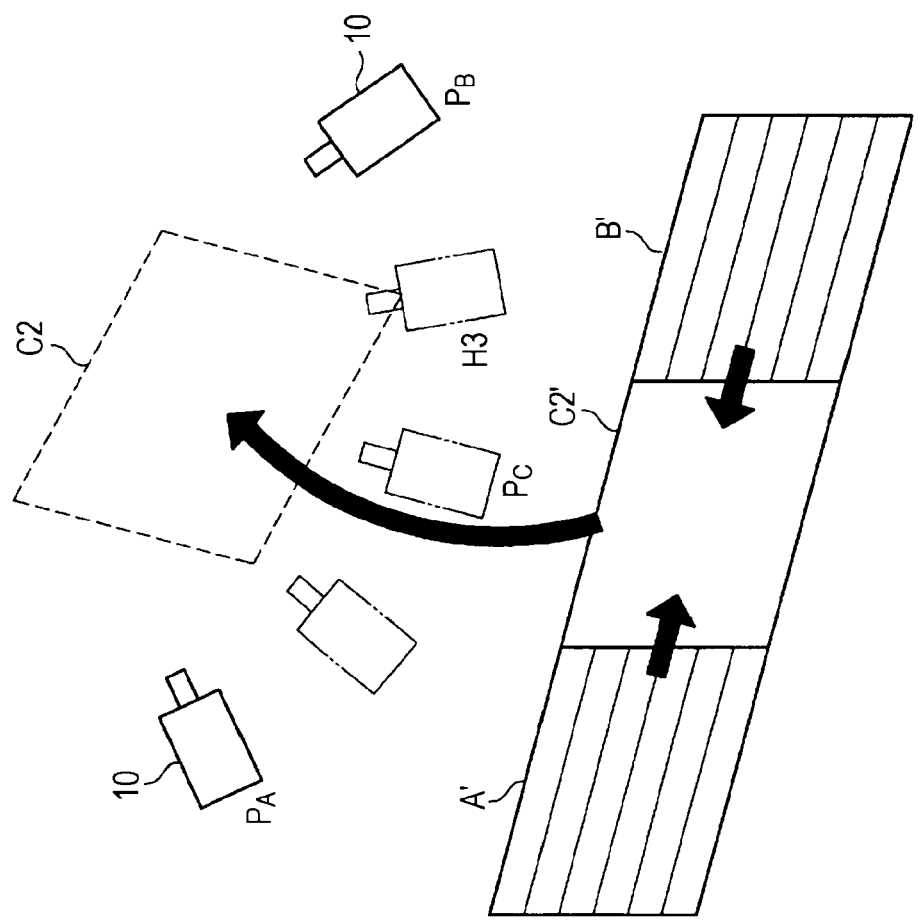
FIG. 4 shows the concept of the view morphing process according to the embodiment.

First, an overview of a morphing process performed by an image processing apparatus according to a first embodiment of the present invention will be described with reference to FIGS. 1 to 4. FIG. 1 shows the concept of a normal morphing process according to the embodiment. FIGS. 2 to 4 show the concept of a view morphing process according to the embodiment.

The term "viewpoint" as used herein includes both a "viewpoint position" and a "viewing direction". The "viewpoint position" refers to the position of a camera 10 at which an original image is captured, and the "viewing direction" refers to the direction from a viewpoint position to an object 1. An "original image" is a photographed image captured by the camera 10, and an "intermediate image" is a virtual image obtained by synthesizing two original images by a morphing process. The object 1 is a desired substance (subject) captured by the camera 10. While the object 1 is a quadrangular prism, for example, for convenience of description in the following description, the object 1 may be any substance such as a person, an animal, a plant, a building, and a commodity.

As shown in FIG. 1, an image processing apparatus according to the embodiment performs a morphing process on two original images (for example, an original image A and an original image B) obtained by a camera 10, which includes a posture sensor and a position sensor, by capturing an identical object 1 from two different viewpoints (for example, a viewpoint $P_A$ and a viewpoint $P_B$). In the morphing process, corresponding pixels in the original image A and the original image B are linearly interpolated to generate an intermediate image C (which is equivalent to an intermediate image C1 of FIG. 1 and an intermediate image C2 of FIG. 4) which would be obtained by seeing the object 1 from a desired virtual viewpoint $P_C$ located between the viewpoint $P_A$ and the viewpoint $P_B$. In this event, more than one intermediate image C may be generated, and a plurality of desired virtual viewpoints $P_C$ may be set between the viewpoint $P_A$ and the viewpoint $P_B$ to generate a plurality of intermediate images C seen from the virtual viewpoints $P_C$. Such a morphing process allows generation of a plurality of intermediate images C that represent how the look of the object 1 would gradually change when the object 1 was seen while moving the viewpoint from the viewpoint $P_A$ to the viewpoint $P_B$.

As discussed above, the morphing process includes a normal morphing process (which is equivalent to a first morphing process) and a view morphing process (which is equivalent to a second morphing process), depending on whether or not camera geometry (relative positional relationship between the camera 10 at the viewpoint $P_A$ and the camera 10 at the viewpoint $P_B$) at which the original images A and B are captured is considered.

The normal morphing process does not consider camera geometry, and does not include a parallelization process for the original images A and B or a back projection process as discussed later. In the normal morphing process, first, image regions in two original images A and B in which an identical object 1 is captured are correlated using a plurality of rectangular regions. In FIG. 1, a characteristic point $X_A$ (coordinate $(x_1, y_1)$) of the object 1 captured in the original image A and a characteristic point $X_B$ (coordinate $(x_2, y_2)$) of the object 1 captured in the original image B are corresponding points that correspond to each other. Subsequently, the shape and the color of the corresponding image regions in the two original images A and B are linearly interpolated to generate an intermediate image C1 of the object 1 seen from the virtual viewpoint $P_C$.

Since the normal morphing process does not consider camera geometry, the object 1 in the intermediate image C1 generated by the morphing may be distorted in the case where the angle θ formed by the two viewpoints $P_A$ and $P_B$ and the object 1 is too large. In the case where optical axes 11 and 12 of the camera 10 at the two viewpoints $P_A$ and $P_B$ at which the original images A and B are captured are perpendicular to a baseline 13 (a straight line connecting the center of the camera 10 at the viewpoint $P_A$ and the center of the camera 10 at the viewpoint $P_B$), it is possible to generate an appropriate intermediate image C1 by linear interpolation. In other cases, however, a distorted intermediate image C1 may be generated by linear interpolation.

In view of the above, the view morphing process is proposed to address the issue that the normal morphing process may result in a distorted intermediate image C1 in the above cases. As shown in FIGS. 2 to 4, the view morphing process considers camera geometry, and includes a parallelization process for the original images A and B and a back projection process for an intermediate image C2' as discussed later.

Specifically, in the view morphing process, as shown in FIGS. 2 and 3, relative positional relationship between the camera 10 at the viewpoint $P_A$ and the camera 10 at the viewpoint $P_B$ is first calculated to perform a parallelization process on the images A and B. In the parallelization process, the original image A captured at the viewpoint $P_A$ and the original image B captured at the viewpoint $P_B$ are rotated such that the original images A and B become parallel to each other, that is, the optical axes 11 and 12 of the camera 10 at the viewpoints $P_A$ and $P_B$ become parallel to each other, to obtain an image A' and an image B'. Subsequently, as shown in FIG. 4, a normal morphing process is performed on the parallelized images A' and B' to obtain an intermediate image C2' as a result of the linear interpolation. Thereafter, as shown in FIG. 4, the obtained intermediate image C2' is projected back into a space before the parallelization process to generate an intermediate image C2 which should be seen from the virtual viewpoint $P_C$.

Thus, in the view morphing process, the original images A and B are subjected to a parallelization process with consideration of relative positional relationship between the camera 10 at the viewpoint $P_A$ and the camera 10 at the viewpoint $P_B$, and then morphed to obtain an intermediate image C2. Thus, it is advantageously possible to generate an appropriate, distortion-free intermediate image C2 even in the case where the angle θ formed by the two viewpoints $P_A$ and $P_B$ and the object 1 is too large or in the case where the optical axes 11 and 12 of the camera 10 are not perpendicular to the baseline 13. In the view morphing process, however, it is necessary to perform a parallelization process and a back projection process for consideration of camera geometry described above, and thus it is necessary to perform complicated processes with a high computational cost, such as a matrix computation process and a singular value decomposition. Therefore, the computational cost of the view morphing process may be at least 10 times or more higher than the computational cost of the normal morphing process.

Thus, the image processing apparatus according to the embodiment detects distortion of an object in an intermediate image C1 generated by the normal morphing process, and appropriately selects one of the normal morphing process without consideration of camera geometry and the view morphing process with consideration of camera geometry depending on the presence or absence of such distortion in order to generate a distortion-free intermediate image C and reduce the computational cost necessary for the morphing process.

Specifically, the image processing apparatus according to the embodiment first detects a straight edge from edges of the object 1 captured in one of the original image A and the original image B (for example, the original image A). The straight edge is each of edges (contours) of the object 1 included in the original image that has a linear shape. Then, the image processing apparatus performs a normal morphing process using the original images A and B to generate a color intermediate image C1, and performs a normal morphing process using binarized versions of the original images A and B to generate a binarized intermediate image C3. Subsequently, the image processing apparatus 20 detects distortion of a corresponding edge of the object 1 included in the intermediate image C3 (binary image). The corresponding edge in the intermediate image C3 is an edge of the object 1 in the intermediate image C3 which corresponds to the straight edge detected in the original image A. Only in the case where the corresponding edge in the intermediate image C3 is found to be distorted as a result of the distortion detection, the image processing apparatus performs a view morphing process using the original images A and B to generate and store a new, distortion-free intermediate image C2. In the case where the corresponding edge in the intermediate image C3 generated by the normal morphing process is found to be not distorted, on the other hand, the image processing apparatus does not perform a view morphing process and stores the intermediate image C1 obtained by the normal morphing process as a final image.

As described above, by detecting distortion of the corresponding edge in the intermediate image C3 actually generated by the normal morphing process, it is possible to appropriately use one of the normal morphing process and the view morphing process depending on the presence or absence of such distortion. Thus, it is possible to generate a natural and distortion-free intermediate image C1 or C2 using the original images A and B captured from the viewpoints $P_A$ and $P_g$. In addition, it is possible to significantly reduce the overall computational cost by reducing the number of executions of the view morphing process with a high computational cost as much as possible. The computational cost reduction effect according to the embodiment is particularly striking in the case where a large number of virtual viewpoints $P_C$ are set between the viewpoints $P_A$ and $P_B$ to sequentially generate a large number of intermediate images C seen from the virtual viewpoints $P_C$ by morphing.

In the following description, a personal computer is used as an example of the image processing apparatus according to the present invention, which executes a morphing process on the original images A and B captured by the camera 10.

In this case, the camera 10 captures an identical object 1 from a plurality of different viewpoints $P_A$ and $P_B$ to generate original images A and B (photographed images) and also generate respective viewpoint information on the positions at which the original images A and B are captured, and stores the original images A and B and the viewpoint information in a storage medium. The viewpoint information represents the viewpoint position (for example, latitude and longitude) and the viewing direction at which the original images A and B are captured, and is generated on the basis of detection values of the posture and position sensors provided in the camera 10. The posture and position sensors may be formed by, for example, a GPS (Global Positioning System) sensor, an angular speed sensor, an accelerator sensor, or a magnetic sensor.

The original images A and B and the viewpoint information are provided from the camera 10 to the image processing apparatus (for example, a personal computer) via a removable storage medium (for example, a memory card or an optical disc) or a network. The image processing apparatus performs a normal morphing process and/or a view morphing process on the original images A and B to generate an intermediate image C1 or C2 and store the generated intermediate image in a storage medium. When the image processing apparatus performs a view morphing process, the viewpoint information associated with the original images A and B is used to perform a parallelization process and so forth on the original images A and B.

The image processing apparatus according to the present invention is not limited to the personal computer described above, and may be any electronic device with an image processing function such as a capturing device including a digital camera and a video camera, for example. The image processing apparatus may also be a portable device such as a cellular phone, a PDA (Personal Digital Assistant), a portable video/music player, a portable terminal, and a game machine. The image processing apparatus may further be a display device such as a television receiver, a recording/playback device such as an optical disc player/recorder, various household electrical appliances, and an industrial image editing device.

[2. Configuration of Image Processing Apparatus]

Figure 5:
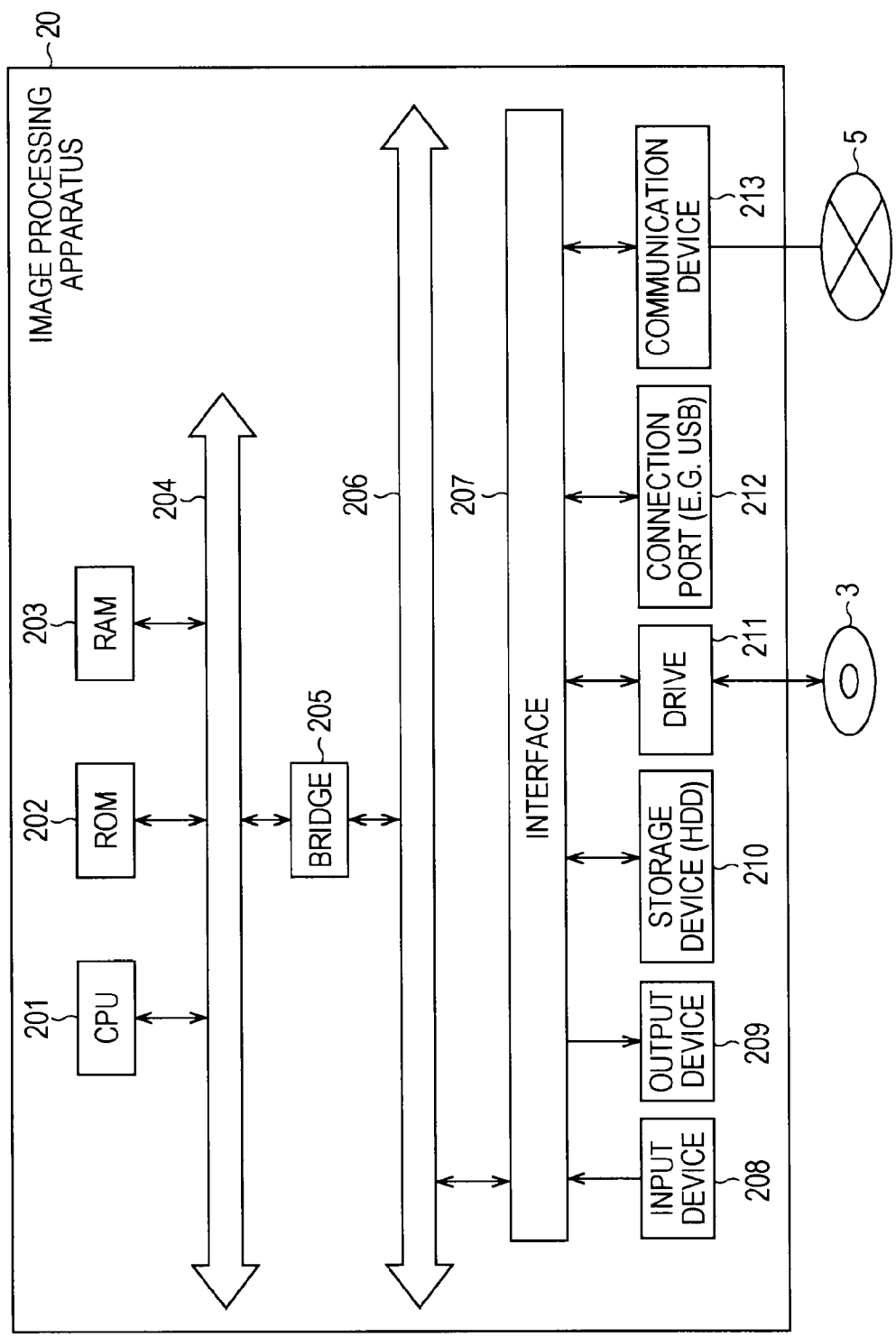
FIG. 5 is a block diagram showing the hardware configuration of an image processing apparatus according to the embodiment.

Now, the hardware configuration of the image processing apparatus 20 according to the embodiment will be described with reference to FIG. 5. FIG. 5 is a block diagram showing the hardware configuration of the image processing apparatus 20 according to the embodiment.

As shown in FIG. 5, the image processing apparatus 20 includes a CPU 201, a ROM 202, a RAM 203, a host bus 204, a bridge 205, an external bus 206, an interface 207, an input device 208, an output device 209, a storage device (HDD) 210, a drive 211, a connection port 212, and a communication device 213, for example. Thus, the image processing apparatus 20 may be formed using a general-purpose computer device, for example.

The CPU 201 functions as an arithmetic processing unit and a control device, and controls the respective sections in the image processing apparatus 200 in accordance with various programs. The CPU 201 executes various processes in accordance with programs stored in the ROM 202 or programs loaded from the storage device 210 into the RAM 203. The ROM 202 stores programs, computation parameters, and so forth to be used by the CPU 201, and also functions as a buffer that mitigates access from the CPU 201 to the storage device 210. The RAM 203 temporarily stores programs to be executed by the CPU 201, computation parameters that may vary during the execution, and so forth. The CPU 201, the ROM 202, and the RAM 203 are connected to each other through the host bus 204 formed by a CPU bus or the like. The host bus 204 is connected via the bridge 205 to the external bus 206 such as a PCI (Peripheral Component Interconnect/Interface) bus.

A memory section (for example, the ROM 202 or a flash memory (not shown)) provided in association with the CPU 201 stores a program for causing the CPU 201 to execute various control processes, and the CPU 201 executes computation processes necessary for control of the respective sections on the basis of the program.

The program according to the embodiment is a program for causing the CPU 201 to execute the various control of the CPU 201 discussed above. The program may be stored in advance in a storage device (such as the storage device 210, the ROM 202, or a flash memory) built in the image processing apparatus 20. The program may also be stored in a removable storage medium 3 such as an optical disc including a CD, a DVD, and a Blu-ray Disc and a memory card to be provided to the image processing apparatus 20, or may be downloaded to the image processing apparatus 20 via a network 5 such as a LAN and the Internet.

The input device 208 is formed by, for example, an operation unit such as a mouse, a keyboard, a touch panel, a button, a switch, and a lever, an input control circuit that generates an input signal to output the generated signal to the CPU 201, and so forth. The output device 209 is formed by, for example, a display device such as a CRT (Cathode Ray Tube) display device and a liquid crystal display (LCD) device and a sound output device such as a speaker. The input device 208 and the output device 209 may not necessarily be provided.

The storage device 210 stores various data, and is formed by, for example, an external or build-in disk drive such as a HDD (Hard Disk Drive). The storage device 210 drives a hard disk serving as a storage medium to store a program to be executed by the CPU 201 and various data. The drive 211 is a storage medium reader/writer built in or external to the image processing apparatus 20. The drive 211 writes/reads various data into/from the removable storage medium 3 loaded into the image processing apparatus 20 such as a magnetic disk, an optical disc, a magneto-optical disk, or a semiconductor memory.

The connection port 212 provides a connection to an external peripheral device, and includes a connection terminal such as a USB port and an IEEE 1394 port. The connection port 212 is connected to the CPU 201 and so forth via the interface 207, the external bus 206, the bridge 205, the host bus 204, and so forth. The communication device 213 is a communication interface formed by a communication device for connection to the network 5, for example. The communication device 213 exchanges various data with an external device such as the camera 10 via the network 5.

Figure 6:
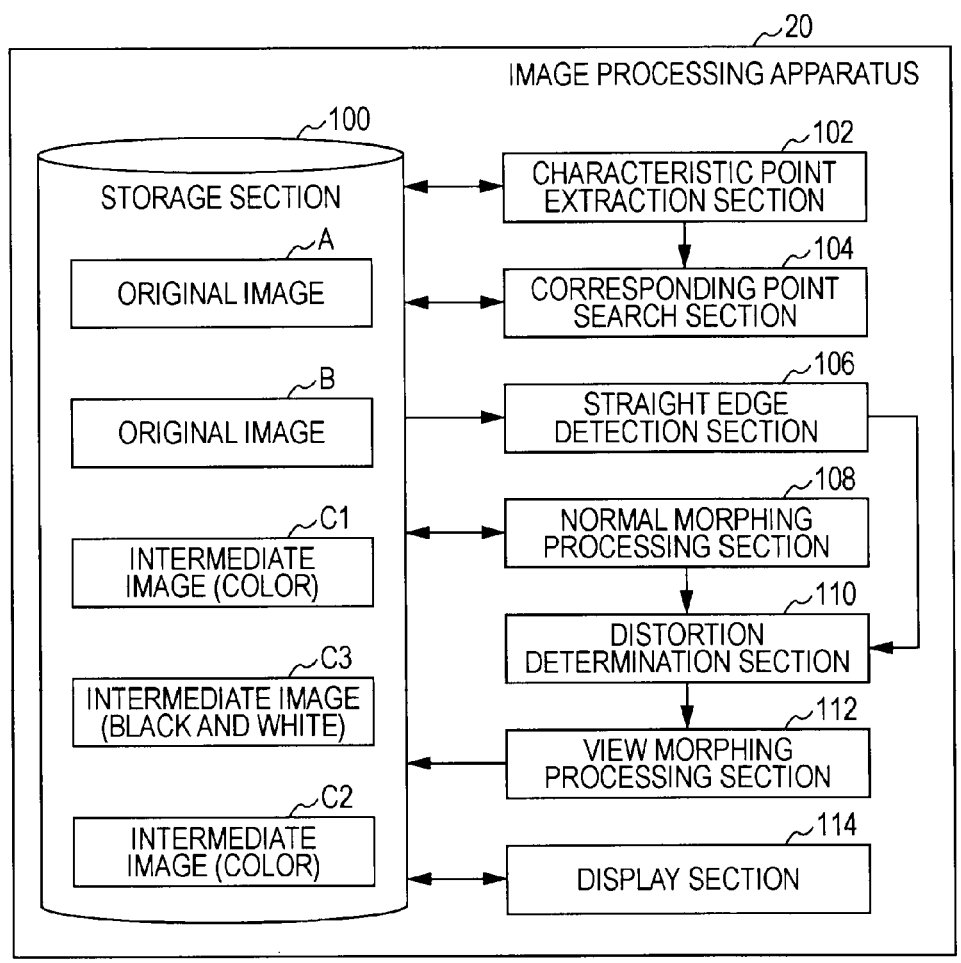
FIG. 6 is a block diagram showing the functional configuration of the image processing apparatus according to the embodiment.

Now, the functional configuration of the image processing apparatus 20 according to the embodiment will be described with reference to FIG. 6. FIG. 6 is a block diagram showing the functional configuration of the image processing apparatus 20 according to the embodiment.

As shown in FIG. 6, the image processing apparatus 20 includes a storage section 100, a characteristic point extraction section 102, a corresponding point search section 104, a straight edge detection section 106, a normal morphing processing section 108, a distortion determination section 110, a view morphing processing section 112, and a display section 114. Each functional section shown in FIG. 6 may be implemented by the CPU by executing a program, or may be formed by dedicated hardware that executes the relevant function. Each functional section will be described below.

The storage section 100 stores two original images A and B captured by the camera 10 discussed above from different viewpoints. The storage section 100 also stores an intermediate image C1 (color image) and an intermediate image C3 (binary image) generated by the normal morphing processing section 108 discussed later, and an intermediate image C2 generated by the view morphing processing section 112 discussed later.

The characteristic point extraction section 102 extracts a characteristic point $X_A$ of an object 1 in one of the original images A as shown in FIG. 1. The corresponding point search section 104 searches the other original image B to find a corresponding point $X_B$ that is a characteristic point corresponding to the characteristic point $X_A$ in the original image A. The characteristic point $X_A$ in the original image A and the corresponding point $X_B$ in the original image B represent an identical point of the identical object 1. The characteristic point extraction section 102 and the corresponding point search section 104 detect a plurality of sets of characteristic points $X_A$ and corresponding points $X_B$ from the original image A and the original image B.

The straight edge detection section 106 detects a straight edge of the object 1 included in at least one of the original image A and the original image B. While a straight edge of the object 1 in the original image A is detected in the following description, it is a matter of course that a straight edge of the object 1 in the original image B may be detected. The straight edge is an edge representing a linear portion of the contours (namely, edges) of the object 1 in the captured original image A. The contours of the object 1 in the captured original image A include linear portions and curved portions. The straight edge detection section 106 first binarizes the original image A read from the storage section 100, then performs expansion and contraction processes on the binarized image to remove noise, and detects a straight edge from the binary image using a Hough transform. The thus detected straight edge is used to detect distortion of a corresponding edge in the intermediate image C3 generated by the normal morphing process discussed later. The straight edge detection process will be discussed in detail later (see FIG. 8).

The normal morphing processing section 108 is an example of the first morphing processing section according to the present invention. The normal morphing processing section 108 performs a normal morphing process on the original images A and B to generate an intermediate image C1 seen from a virtual viewpoint $P_C$. The normal morphing processing section 108 linearly interpolates the shape and the brightness values of corresponding image regions in the original images A and B using the characteristic points $X_A$ in the original image A and the corresponding points $X_B$ in the original image B to generate an intermediate image C1 (color). Also, the normal morphing processing section 108 binarizes the original images A and B, and performs a normal morphing process on the binarized original images A and B to generate a binarized intermediate image C3 (black and while).

Thus, it is possible for the normal morphing processing section 108 to perform a normal morphing process on the original images A and B without binarization to generate a normal intermediate image C1 (color), and also to generate a binarized intermediate image C3 (black and white). The normal morphing processing section 108 stores the generated intermediate images C1 and C3 in the storage section 100. The normal morphing process will be discussed in detail later (see FIGS. 12 and 15).

The distortion determination section 110 detects distortion of a corresponding edge of the object 1 in the binarized intermediate image C3 generated by the normal morphing processing section 108. The corresponding edge is an edge in the intermediate image C3 that corresponds to the straight edge in the original image A detected by the straight edge detection section 106. The distortion determination section 110 specifies, on the basis of the pixel position of a straight edge in the original image A, the pixel position of a corresponding edge in the intermediate image C3 that corresponds to that straight edge. Subsequently, the distortion determination section 110 determines whether or not the area (for example, the number of pixels) of an image region surrounded by the corresponding edge in the intermediate image C3 and a line connecting both ends of the edge is a threshold determined by a predetermined determination criterion constant or more. The distortion determination section 110 determines that the edge in the intermediate image C3 is distorted in the case where the area is the threshold or more, and determines that the edge in the intermediate image C3 is not distorted in the case where the area is less than the threshold. The distortion detection process will be discussed in detail later (see FIG. 16).

The view morphing processing section 112 is an example of the second morphing processing section according to the present invention. In the case where the distortion determination section 110 determines that the edge in the intermediate image C3 is distorted, the view morphing processing section 112 performs a view morphing process on the original images A and B to generate an intermediate image C2 (color) seen from a virtual viewpoint $P_C$. Specifically, the view morphing processing section 112 first performs a parallelization process on the original images A and B on the basis of the viewpoint information on the original images A and B. The view morphing processing section 112 then linearly interpolates the shape and the brightness values of corresponding image regions in the parallelized original images A and B using the characteristic points $X_A$ in the original image A and the corresponding points $X_B$ in the original image B to generate an intermediate image C2' seen from the virtual viewpoint $P_C$. Thereafter, the view morphing processing section 112 projects the intermediate image C2' back into a space before the parallelization process on the basis of the viewpoint information on the original images A and B to generate an intermediate image C2. Subsequently, the view morphing processing section 112 stores the generated intermediate image C2 in the storage section 100. The view morphing process will be discussed in detail later (see FIG. 18).

The display section 114 displays the original images A and B which are photographed images and the intermediate image C1 or C2 which is a virtual image. It is possible for the display section 114 to show on a display screen how the object 1 naturally changes from one form in the original image A into the other in the original image B, by sequentially displaying the original image A, the intermediate image C1 or C2, and the original image B in accordance with the direction of movement of the viewpoint.

[3. Image Processing Method]

Figure 7:
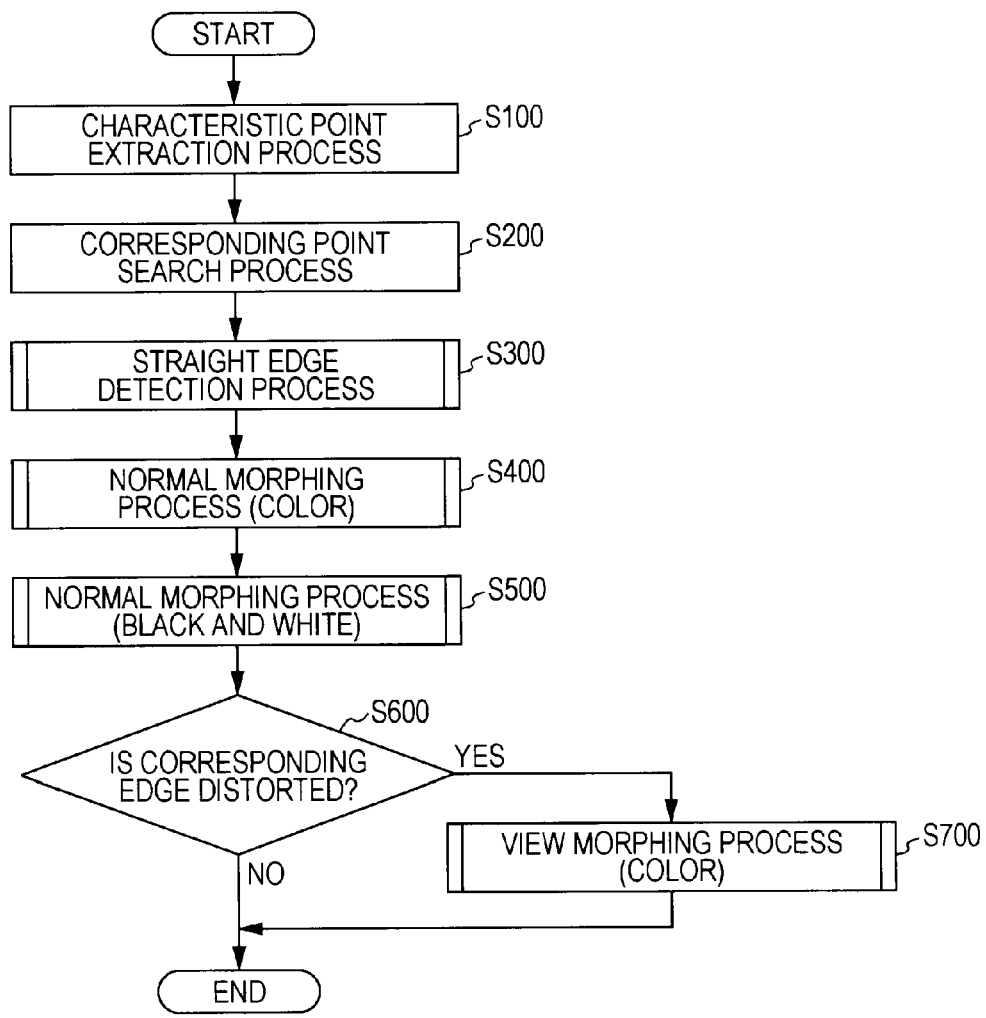
FIG. 7 is a flowchart showing an image processing method according to the embodiment.

Now, the overall flow of an image processing method performed by the image processing apparatus 20 according to the embodiment will be described with reference to FIG. 7. FIG. 7 is a flowchart showing an image processing method according to the embodiment.

As shown in FIG. 7, the image processing apparatus 20 first performs a characteristic point extraction process to extract characteristic points $X_A$ in an original image A, of two original images A and B captured at two different viewpoints $P_A$ and $P_B$ (S100), and then performs a corresponding point search process to search the original image B to find corresponding points $X_B$ corresponding to the characteristic points $X_A$ (S200).

The image processing apparatus 20 further performs a straight edge detection process to detect a straight edge of an object 1 in the original image A or B (S300). The straight edge detection process (S300) may be performed at any timing before a distortion detection process (S600) to be discussed later, and may be performed before the characteristic point extraction process (S100) or after a normal morphing process (S400 or S500), for example.

Thereafter, the image processing apparatus 20 performs a first normal morphing process on the original images A and B which are color images to generate an intermediate image C1 (color image) seen from a virtual viewpoint $P_C$ between the two viewpoints $P_A$ and $P_B$ (S400). The image processing apparatus 20 further performs a second normal morphing process on black-and-white images obtained by binarizing the original images A and B to generate a black-and-white intermediate image C3 (binary image) seen from the virtual viewpoint $P_C$ (S500). The black-and-white binarized intermediate image C3 functions as a distortion detection image for detecting distortion generated by the normal morphing process in S600 which follows.

The image processing apparatus 20 then detects whether or not an edge (corresponding edge), of edges of the object 1 in the black-and-white intermediate image C3 generated in S500, that corresponds to the straight edge detected in S300 is distorted (S600). That is, it is detected whether the corresponding edge in the intermediate image C3 is a straight edge or a distorted, curved edge. In the case where the corresponding edge in the intermediate image C3 is not straight, it is possible to determine that the images of the object 1 in the intermediate images C1 and C3 are distorted.

In the case where the corresponding edge in the intermediate image C3 is found to be distorted as a result of the distortion detection process (S600), the image processing apparatus 20 performs a view morphing process on the original images A and B which are color images to generate a color intermediate image C2 seen from the virtual viewpoint $P_C$ (S700). Thus, in the case where the intermediate images C1 and C3 generated by the normal morphing process (S400) are distorted, the image processing apparatus 20 further executes a view morphing process (S700) to obtain a distortion-free intermediate image C2 and store the obtained intermediate image C2 in the storage section 100.

In the case where the corresponding edge in the intermediate image C3 is not distorted in S600, on the other hand, the image processing apparatus 20 terminates the process without performing a view morphing process (S700). Thus, in the case where the corresponding edge in the intermediate image C3 (binary image) generated by the normal morphing process (S500) is not distorted, the image processing apparatus 20 stores the intermediate image C1 (color image) generated by the normal morphing process (S400) in the storage section 100.

According to the image processing method of the embodiment, as described above, in the case where it is possible to generate a distortion-free intermediate image C1 by the normal morphing process (S400), the view morphing process (S700) is not executed. Only in the case where the intermediate image C1 obtained by the normal morphing process (S400) is distorted, on the other hand, the view morphing process (S700) is executed. Thus, the view morphing process is not performed in all cases, but is executed only in cases where it is necessary to execute the view morphing process in order to obtain a distortion-free intermediate image C. Hence, a distortion-free intermediate image C is reliably generated by either of the normal morphing process and the view morphing process, and the view morphing process (S700) is not unnecessarily performed to reduce the computational cost.

The outline of the image processing method according to the embodiment has been described above with reference to FIG. 7. Each of the processes S100 to S700 of FIG. 7 will be discussed in detail below.

[3.1. Characteristic Point Extraction Process and Corresponding Point Search Process]

First, the characteristic point extraction process (S100) and the corresponding point search process (S200) of FIG. 7 are discussed in detail.

The image processing apparatus 20 reads from the storage section 100 two original images A and B captured at two different viewpoints $P_A$ and $P_B$. Then, as shown in FIG. 1, the image processing apparatus 20 extracts a plurality of characteristic points $X_A$ of an object 1 from one of the original images A (S100), and searches the other original image B to find a plurality of corresponding points $X_B$ respectively corresponding to the plurality of characteristic points $X_A$ in the original image A (S200).

For example, the image processing apparatus 20 extracts characteristic points $X_A$ of the object 1 in the original image A captured at the viewpoint $P_A$ using a corner detection algorithm such as a Harris operator. The image processing apparatus 20 then obtains corresponding points $X_B$ in the original image B that correspond to the characteristic points $X_A$ in the original image A (see FIG. 1) by tracking characteristic points in the original image B using a characteristic point tracking algorithm such as a KLT-Tracker, for example. This makes it possible to set characteristic points $X_A$ and corresponding points $X_B$ corresponding to each other in the original images A and B, and to obtain a coordinate $(X_1, Y_1)$ of a characteristic point $X_A$ in the original image A and a coordinate $(X_2, Y_2)$ of a corresponding point $X_B$ in the original image B.

In order to obtain the characteristic points $X_A$ and the corresponding points $X_B$ described above, it is necessary that the two original images A and B include an identical part of the identical object 1. In addition, in order to obtain relative positional relationship between the camera 10 at the viewpoint $P_A$ and the camera 10 at the viewpoint $P_B$ in the view morphing process (S700), it is necessary to obtain at least 8 sets of characteristic points $X_A$ and corresponding points $X_B$.

[3.2. Straight Line Edge Detection Process]

Now, the straight edge detection process (S300) of FIG. 7 is discussed in detail with reference to FIGS. 8 to 11. FIG. 8 is a flowchart showing the straight edge detection process (S300) of FIG. 7.

In the straight edge detection process (S300), as shown in FIG. 8, a straight edge of the object 1 included in one of the original image A and the original image B is detected using a Hough transform. While the original image A is used as the target of the straight edge detection process in the following description, the original image B may also be used.

The image processing apparatus 20 first emphasizes edges such as boundary lines of the object 1 in the original image A using an edge emphasis filter such as a Laplacian filter 302 (see FIG. 9) (S302). In the edge emphasis process, for example, pixel values of an output image obtained by applying the Laplacian filter 302 to the original image A are subtracted from pixel values of the original image A to expand change points of the image. As a result of the edge emphasis process (S302), the edges in the original image A are emphasized to provide a clear image.

The image processing apparatus 20 then binarizes the original image A, the edges of which have been emphasized in S302, to obtain a black-and-white binary image (S304). The binary image is a black-and-white image in which the object 1 in the original image A is represented by a white region (see FIG. 10).

As shown in FIG. 10, the image processing apparatus 20 further performs an expansion process and a contraction process on the original image A binarized in S304 to remove noise from the binarized original image A (S306).

Specifically, the image processing apparatus 20 first performs an expansion process on the binarized original image A to generate an image A1 in which white pixels are expanded. In the expansion process, pixels in the binarized original image A that have at least one white adjacent pixel, of the four adjacent pixels, are turned into white pixels. Such an expansion process expands isolated white noise in the binary image A to generate an image A1 in which broken straight lines have been restored and black noise has been removed.

The image processing apparatus 20 then performs a contraction process on the original image A which has been subjected to the expansion process to generate an image A2 in which white pixels are contracted. In the contraction process, pixels in the image A1 that have at least one black adjacent pixel, of the four adjacent pixels, are turned into black pixels. Such a contraction process removes isolated white noise in the image A1 to generate an image A2 in which a figure of the object 1 has been contracted by one pixel.

Figure 11:
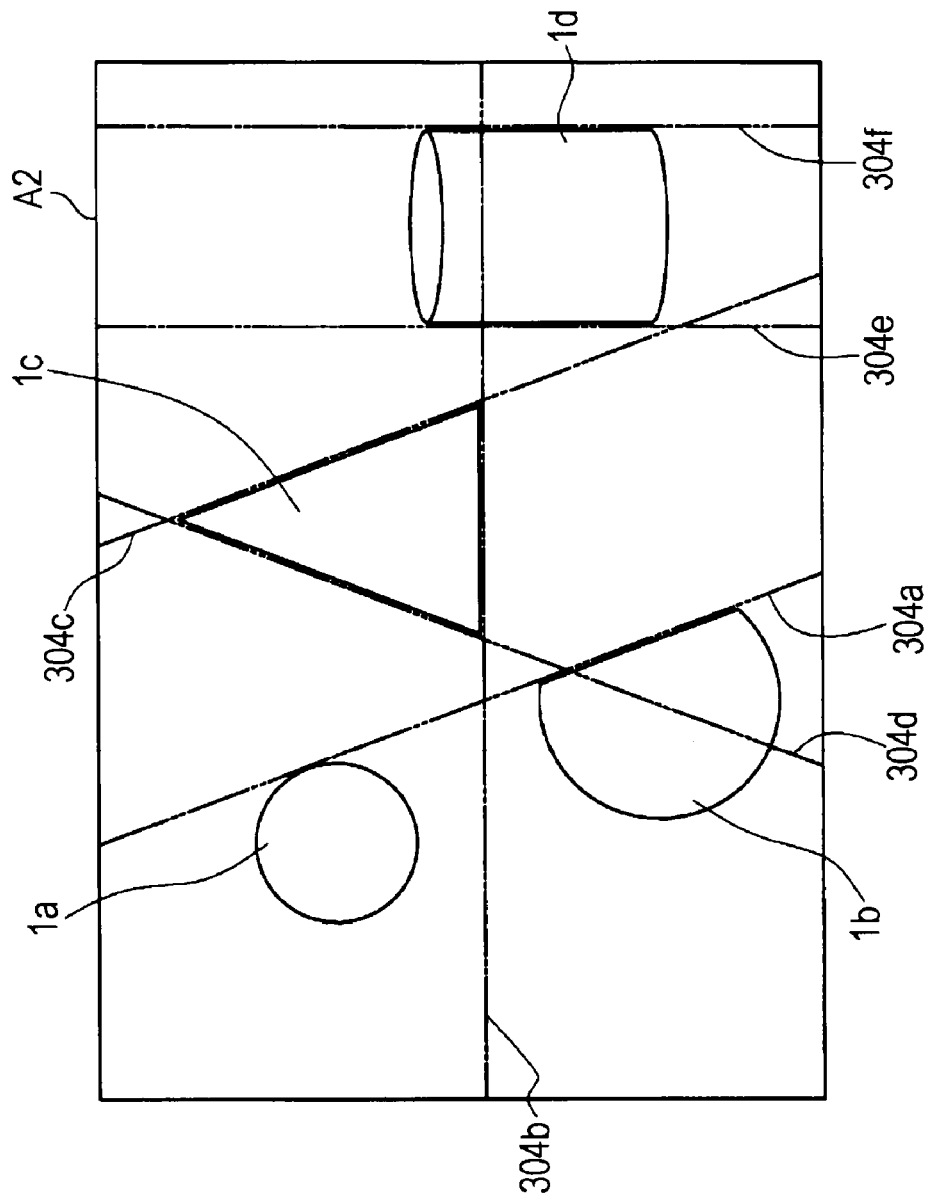
FIG. 11 illustrates straight lines in an image detected using a Hough transform according to the embodiment.

Thereafter, as shown in FIG. 11, the image processing apparatus 20 detects a straight line 304 from the image A2 from which noise has been removed in S306 using a Hough transform, for example, to detect a straight edge from the edges of the object 1 in the image A2 (S308). For input parameters (for example, number of straight lines, edge threshold, side width, angle, and distance) for performing the Hough transform, optimum values that are obtained experimentally are used.

The Hough transform is commonly used to detect a straight line from an image. In the Hough transform, a point (x, y) on an orthogonal coordinate system of an original image is transformed into a two-dimensional polar coordinate space with an angle θ and a distance ρ, and the number of points for each angle θ and each distance ρ are added on a memory array. For a combination of the angle θ and the distance ρ with which the number of points is largest, such points are transformed back into the original orthogonal coordinate to obtain a collection of points that are most likely to form a straight line in the original image.

In the example of FIG. 11, four objects 1a to 1d are included in the image A2, and straight edges represented by straight lines 304a to 304f are detected from edges defining the boundary lines (contours) of the objects 1a to 1d. For example, the object 1d in a cylindrical shape has edges (contours) formed by upper and lower curved edges and left and right straight edges. From these edges, the straight edges represented by the straight lines 304e and 304f detected using the Hough transform are detected.

As described above, in the straight edge detection process (S300), a straight edge of the object 1 included in one of the original images A and B is detected using a Hough transform. The straight edge is used in the distortion detection process (S500) to be discussed later.

[3.3. Normal Morphing Process (Color Image)]

Figure 12:
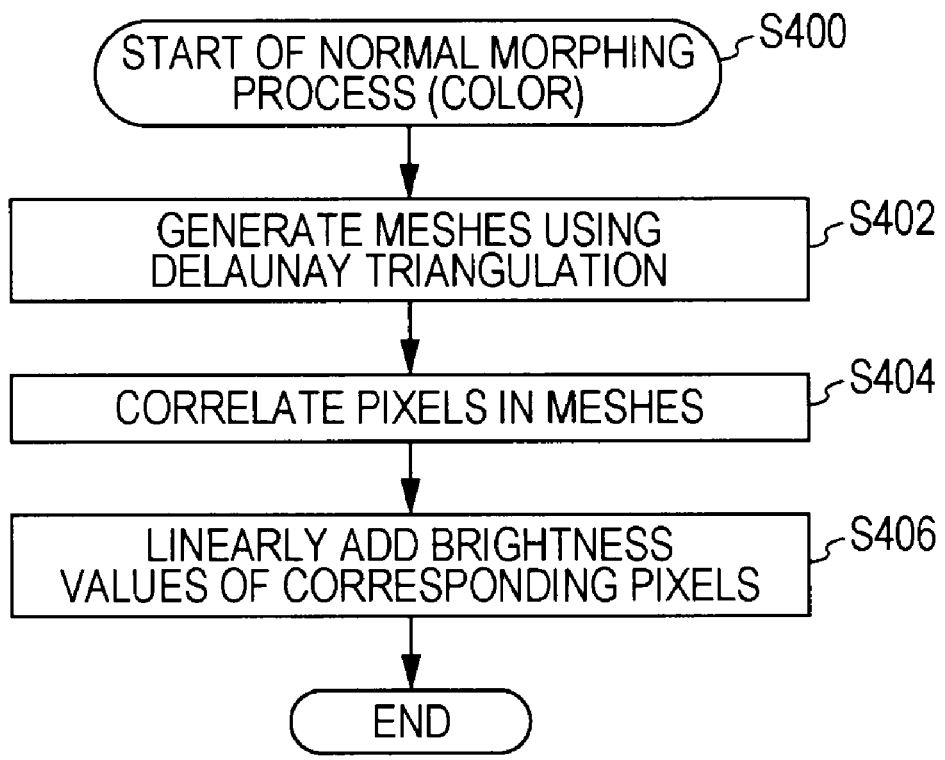
FIG. 12 is a flowchart showing a normal morphing process (S400) of FIG. 7.
Figure 13:
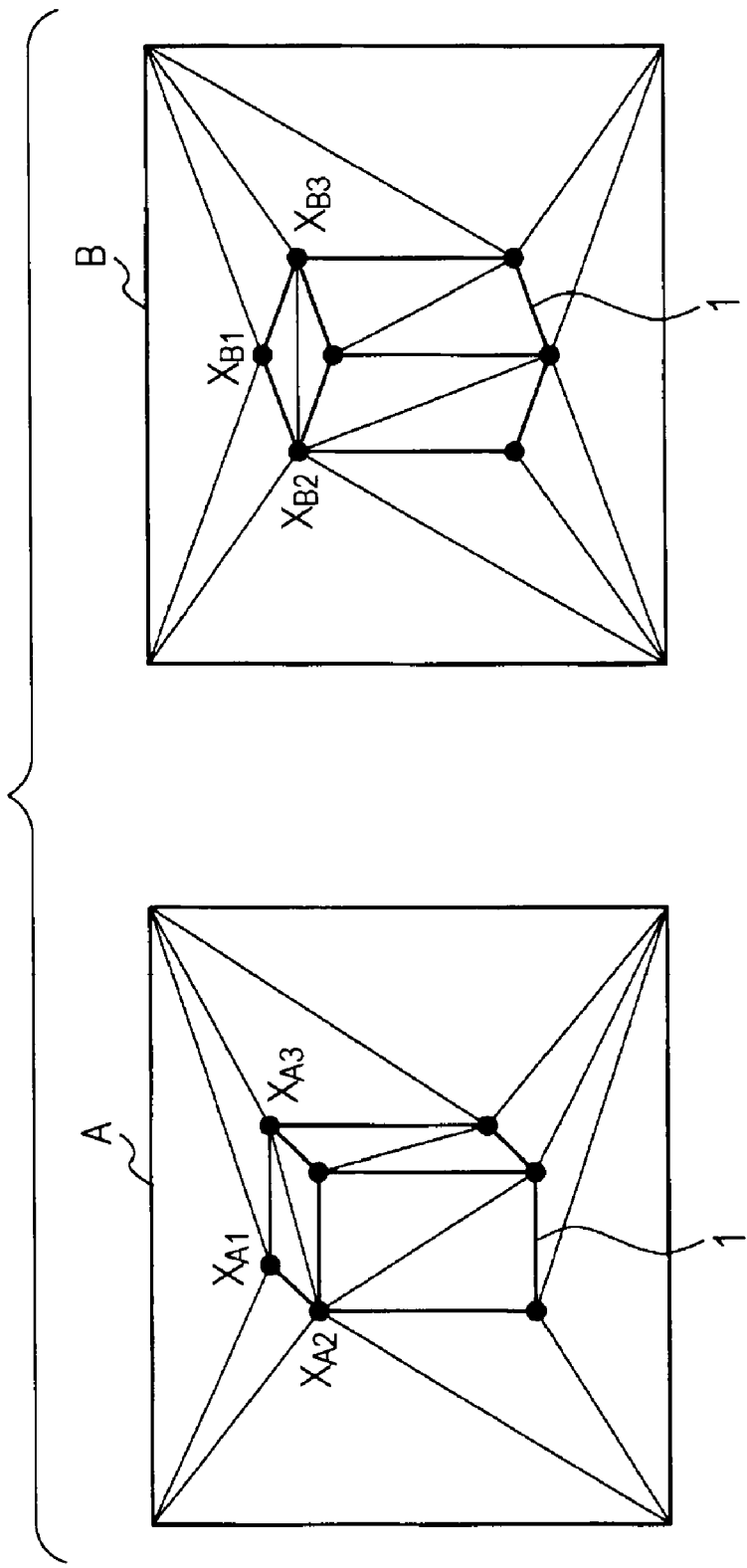
FIG. 13 illustrates images over which Delaunay triangle nets are placed according to the embodiment.
Figure 14:
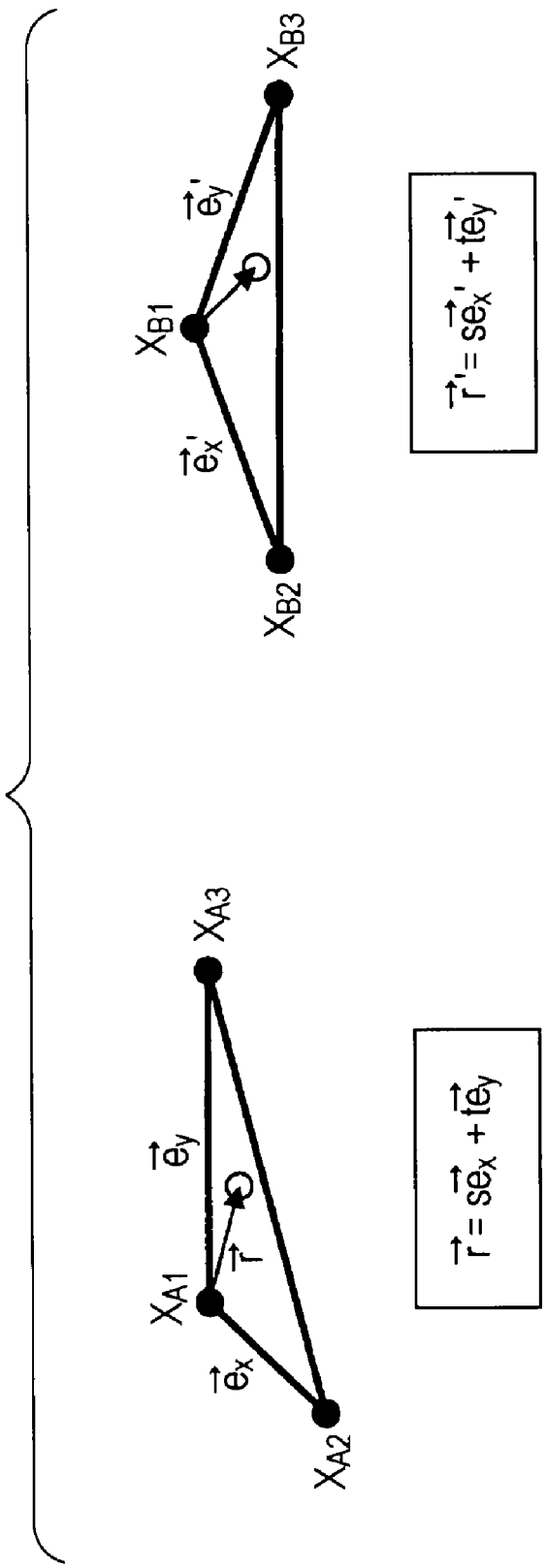
FIG. 14 illustrates pixels in a triangle mesh represented by a vector according to the embodiment.

Now, the normal morphing process for color images (S400) of FIG. 7 is discussed in detail with reference to FIGS. 12 to 14. FIG. 12 is a flowchart showing the normal morphing process (S400) of FIG. 7.

In the normal morphing process (S400), as shown in FIG. 12, a normal morphing process is performed on the original images A and B using the characteristic points $X_A$ in the original image A obtained in the characteristic point extraction process (S100) and the corresponding points $X_B$ in the original image B obtained in the corresponding point search process (S200). Consequently, an intermediate image C1 (color image) that would be obtained by seeing the object 1 from a virtual viewpoint $P_C$ is generated.

The image processing apparatus 20 first generates triangle meshes (Delaunay triangle nets) in each of the original image A and the original image B using a Delaunay triangulation (S402). As shown in FIG. 13, in the original image A, triangle meshes are placed so as to connect a plurality of characteristic points $X_{A1}, X_{A2}, X_{A3}, \ldots$ obtained in the characteristic point extraction process (S100). In the original image B, also, triangle meshes are placed so as to connect a plurality of corresponding points $X_{B1}, X_{B2}, X_{B3}, \ldots$ obtained in the corresponding point search process (S200). The triangle meshes in the original image A and the triangle meshes in the original image B correspond to each other, and represent identical regions of the object 1.

The image processing apparatus 20 then correlates pixels in each mesh between the original image A and the original image B (S404). Specifically, as shown in FIG. 14, for each mesh of the original images A and B, the relative positions of all the pixels inside the mesh with respect to a first vertex $X_{A1}$ or $X_{B1}$ of the mesh are represented by vectors as given by the following formulas (1) and (2).

$$\vec{r} = s\vec{e}_x + t\vec{e}_y \qquad (1)$$

$$\vec{r}\,' = s\vec{e}_x{'} + t\vec{e}_y{'} \qquad (2)$$

In this event, the meshes in the original images A and B have been subjected to an affine transformation, and thus parameters s and t of the vectors in the formulas (1) and (2) take values common to the two original images A and B. Respective pixels in each mesh are correlated between the original images A and B through the vector representation that uses the parameters s and t. The affine transformation is a mode of transformation that keeps geometrical nature, that is, points on a straight line in the original image are also arranged on a straight line after the transformation, and parallel lines in the original image are also parallel lines after the conversion.

Thereafter, the image processing apparatus 20 linearly adds the RGB brightness values between the corresponding pixels in the original image A and the original image B correlated in S404 to generate an intermediate image C1 seen from the virtual viewpoint $P_C$ (S406). For example, the brightness values (RGB) of the corresponding pixels are respectively linearly added between a triangle mesh ($X_{A1}$, $X_{A2}$, $X_{A3}$) in the original image A and a corresponding triangle mesh ($X_{B1}$, $X_{B2}$, $X_{B3}$) in the original image B shown in FIG. 13 to determine the brightness values (RGB) of pixels in a region corresponding to the mesh in the intermediate image C1. In this event, it is possible to generate an intermediate image C1 with desired brightness values by adjusting the blend ratio between the brightness values to be linearly added.

As described above, in the normal morphing process for color images (S400), meshes are generated in the two original images A and B using a Delaunay triangulation and the brightness values are linearly interpolated between the corresponding meshes to generate an intermediate image C1 which is a color image seen from a desired virtual viewpoint $P_C$.

[3.4. Normal Morphing Process (Binary Image)]

Figure 15:
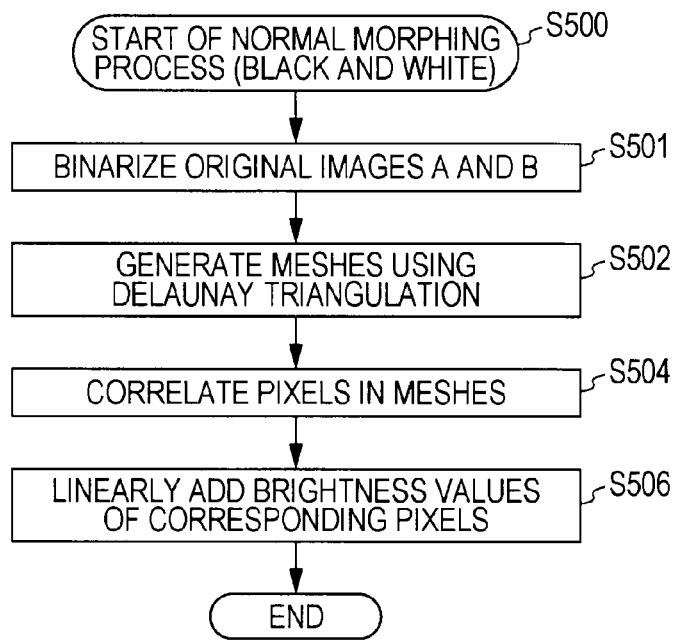
FIG. 15 is a flowchart showing a normal morphing process (S500) of FIG. 7.

Now, the normal morphing process for binary images (S500) of FIG. 7 is discussed in detail with reference to FIG. 15. FIG. 15 is a flowchart showing the normal morphing process (S500) of FIG. 7.

In the normal morphing process for binary images (S500), as shown in FIG. 15, the image processing apparatus 20 first binarizes the original images A and B to obtain a binarized version of the original image A and a binarized version of the original image B (S501). Thereafter, the image processing apparatus 20 performs a normal morphing process on the binarized original images A and B in the same manner as the normal morphing process for color images (S400) of FIG. 12 discussed above. That is, the image processing apparatus 20 generates triangle meshes in the binarized original images A and B using a Delaunay triangulation (S502), correlates all the pixels between the meshes in the original images A and B (S504), and linearly adds the brightness values of the correlated pixels (S506).

Thus, an intermediate image C3 (binary image) that would be obtained by seeing the object 1 from a virtual viewpoint $P_C$ is generated by performing a normal morphing process on the binarized original images A and B. Such an intermediate image C3 which is a binary image is used as the target of distortion detection in the subsequent distortion detection process (S600).

[3.5. Distortion Detection Process]

Figure 16:
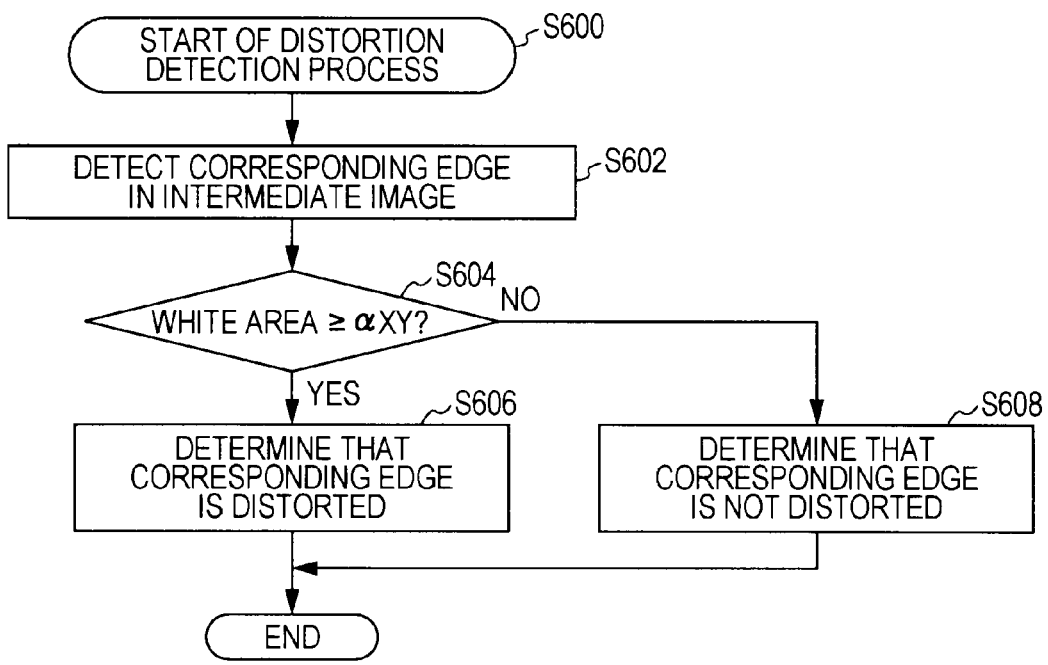
FIG. 16 is a flowchart showing a distortion determination process (S600) of FIG. 7.

Now, the distortion detection process (S600) of FIG. 7 is discussed in detail with reference to FIG. 16. FIG. 16 is a flowchart showing the distortion determination process (S600) of FIG. 7.

In the distortion detection process (S600), as shown in FIG. 16, it is detected whether or not a corresponding edge of the object 1 in the intermediate image C3 (binary image) generated in S500 (namely, an edge in the intermediate image C1 that corresponds to the straight edge detected in S300) is distorted.

If the normal morphing process in S500 has been performed normally, the corresponding edge in the intermediate image C1 should be a straight edge. In the case where the angle θ (see FIG. 1) formed by the viewpoints $P_A$ and $P_B$, at which the original images A and B are captured and the object 1 is so large, however, the intermediate image C1 generated by the normal morphing process (S400) may be distorted. Thus, in the embodiment, an intermediate image C3 which is a binary image is generated by the normal morphing process (S500), and the intermediate image C3 is used for distortion detection to detect whether or not distortion of the corresponding edge in the intermediate image C3 is a predetermined threshold or more.

Figure 17:
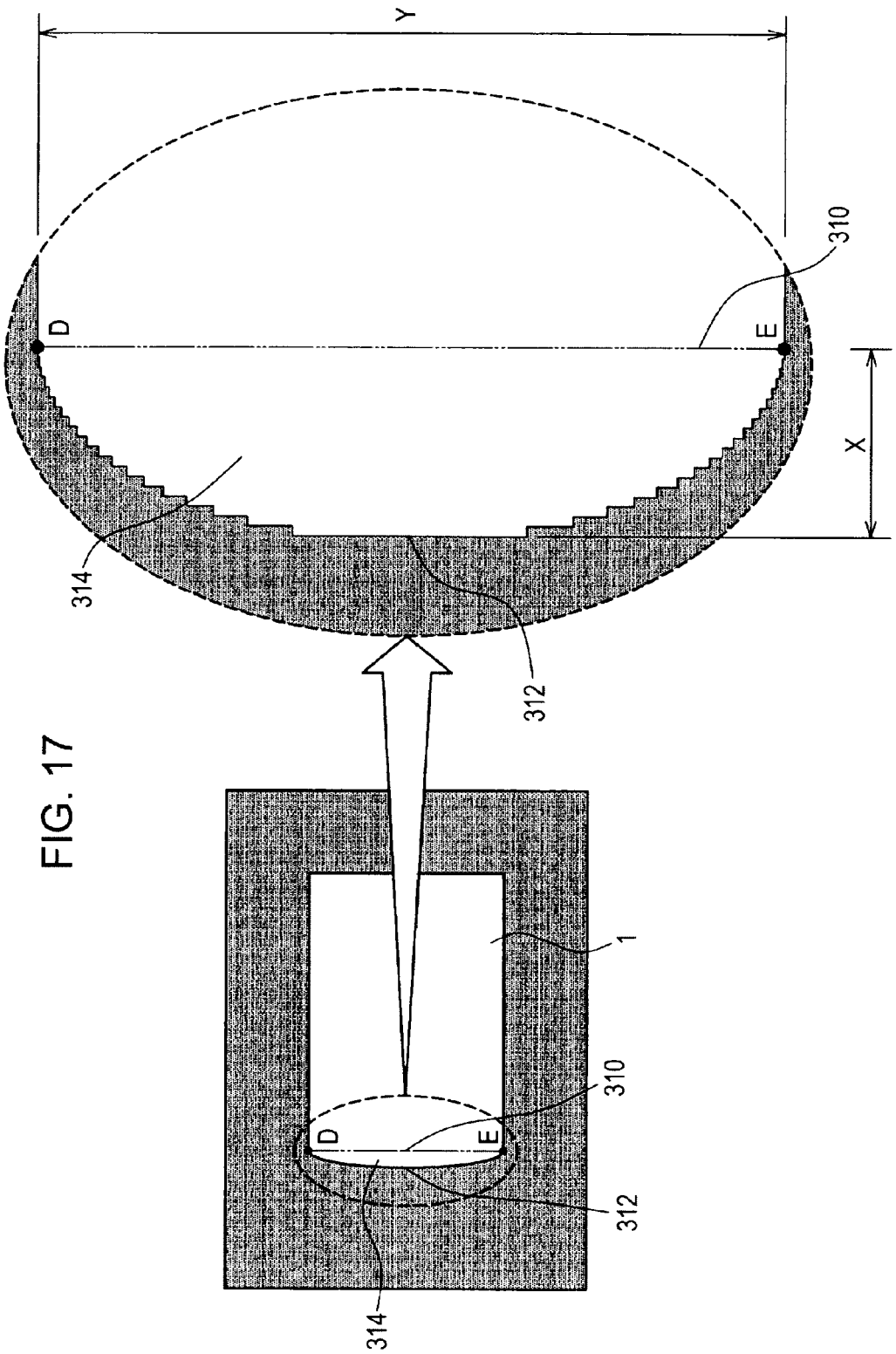
FIG. 17 illustrates a process for detecting distortion of a corresponding edge according to the embodiment.

Specifically, the image processing apparatus 20 first detects an edge (corresponding edge), of the edges of the object 1 in the intermediate image C3 (binary image) generated in S500, that corresponds to the straight edge in the original image A detected in S300 (S602). For example, as shown in FIG. 17, the image processing apparatus 20 detects a corresponding edge 312 in the intermediate image C3 that corresponds to a straight edge 310 in the original image A detected in S300. By utilizing positional information on the respective pixels in the original images A and B obtained when such pixels are linearly interpolated during the normal morphing process (S500), it is possible to obtain the position of the corresponding edge 312 in the intermediate image C3 that corresponds to the straight edge 310 in the original image A. Thus, the image processing apparatus 20 specifies the corresponding edge 312 in the binarized intermediate image C3 on the basis of the positional information on the pixels obtained during the normal morphing process (S500).

Then, as shown in FIG. 17, the image processing apparatus 20 calculates an area S (number of pixels) of a white image region 314 surrounded by the corresponding edge 312 detected in S602 and a line segment D-E connecting both ends of the corresponding edge 312 to determine whether or not the area S of the image region 314 is a predetermined threshold or more (S604).

For example, in the case where the corresponding edge 312 in the intermediate image C3 is distorted with respect to the straight edge 310 in the original image A as shown in FIG. 17, a semi-elliptical white image region 314 surrounded by the straight edge 310 (line segment D-E) and the corresponding edge 312 is provided. As the area S of the white image region 314 is larger, the corresponding edge 312 in the intermediate image C3 is distorted to a greater degree.

Thus, the image processing apparatus 20 compares the area S of the image region 314 with a threshold ($=\alpha \cdot X \cdot Y$) determined by a predetermined determination criterion constant α as given by the formulas (3) and (4) to determine the presence or absence of distortion of the corresponding edge 312 in accordance with the comparison results.

$$\text{Area } S \text{ of white image region } 314 \geq \alpha \cdot X \cdot Y\text{: The corresponding edge 312 is distorted.} \quad (3)$$

$$\text{Area } S \text{ of white image region } 314 < \alpha \cdot X \cdot Y\text{: The corresponding edge 312 is not distorted.} \quad (4)$$

α: Determination criterion constant ($0 < \alpha < 1$)

The values of the area S, the height Y, and the width X of the white image region 314 may be determined using the number of pixels in the image region 314. The threshold ($=\alpha \cdot X \cdot Y$) is a value obtained by multiplying the product of the maximum height Y and the maximum width X of the image region 314 by the determination criterion constant α. The determination criterion constant α is a fixed value that is more than 0 and less than 1, for example α=0.5. By using such a threshold ($=\alpha \cdot X \cdot Y$), it is possible to determine the presence or absence of distortion of the corresponding edge 312 using the proportion of the image region 314 occupying the rectangular region defined by the maximum height Y and the maximum width X as the threshold. In this event, the detection accuracy for distortion of the corresponding edge 312 may be controlled by adjusting the value of the determination criterion constant α. For example, increasing α toward 1 reduces the distortion detection accuracy, and reducing α toward 0 increases the distortion detection accuracy.

If the area S of the image region 314 (the number of pixels included in the image region 314) is the predetermined threshold (=α·X·Y) or more as a result of the determination performed in S604 using the formulas (3) and (4), the image processing apparatus 20 determines that the corresponding edge 312 of the intermediate image C3 is distorted (S606). In this case, the intermediate image C1 generated by the normal morphing process (S400) is distorted significantly, and thus the image processing apparatus 20 executes a view morphing process (S700). For example, in the case where a plurality of intermediate images C are to be generated between the viewpoints $P_A$ and $P_B$ and a corresponding edge 312 is distorted in at least one of all the intermediate images C3 generated by the normal morphing process, the image processing apparatus 20 transitions into a mode for executing a view morphing process (S700) to generate a distortion-free intermediate image C2.

On the other hand, if the area S is not the predetermined threshold (=α·X·Y) or more, the image processing apparatus 20 determines that the corresponding edge 312 of the intermediate image C3 is not distorted (S608). In this case, the intermediate image C1 generated by the normal morphing process (S400) is not distorted at all or is distorted slightly, and thus the image processing apparatus 20 terminates the process without executing a view morphing process (S700). For example, in the case where a plurality of intermediate images C are to be generated between the viewpoints $P_A$ and $P_B$ and a corresponding edge 312 is not distorted in any of the intermediate images C3 generated by the normal morphing process, it is not necessary to execute a view morphing process (S700), and the image processing apparatus 20 outputs the intermediate image C1 generated by the normal morphing process (S400) as the resulting image.

[3.6. View Morphing Process]

Figure 18:
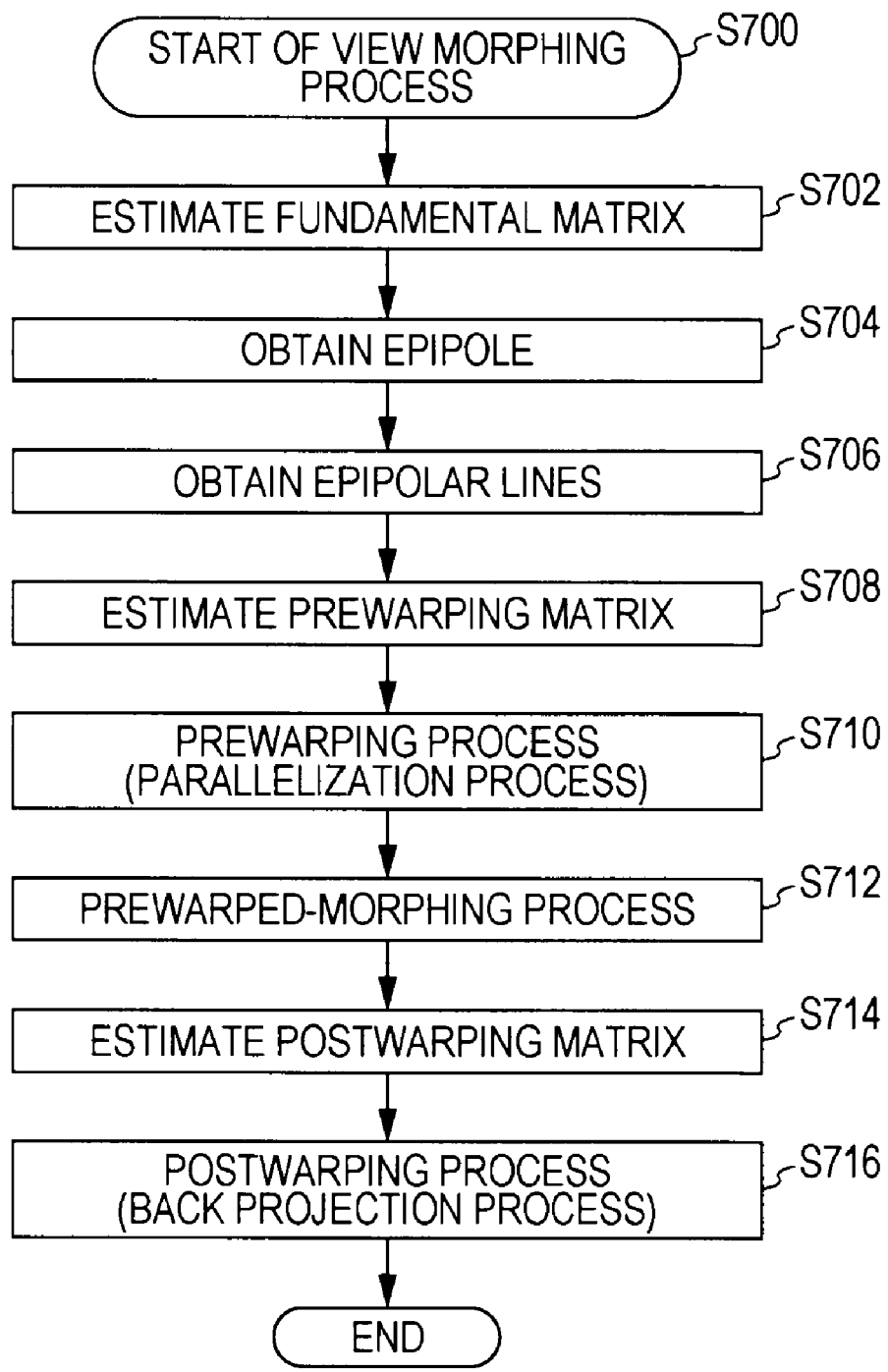
FIG. 18 is a flowchart showing a view morphing process (S700) of FIG. 7.

Now, the view morphing process (S700) of FIG. 7 is discussed in detail with reference to FIG. 18. FIG. 18 is a flowchart showing the view morphing process (S700) of FIG. 7.

In the view morphing process (S700), as shown in FIG. 18, the image processing apparatus 20 first obtains relative positional relationship (camera geometry) between the camera 10 at the viewpoint $P_A$ and the camera 10 at the viewpoint $P_B$ shown in FIG. 2 using the characteristic points $X_A$ in the original image A and the corresponding points $X_B$ in the original image B (S702 to S706). Then, as shown in FIG. 3, the image processing apparatus 20 performs, on the basis of the relative positional relationship of the camera 10, a parallelization process in which the original image A captured at the viewpoint $P_A$ and the original image B captured at the viewpoint $P_B$ are projected onto an identical virtual plane such that the two original images A and B become parallel to each other (S708 to S710). Thereafter, as shown in FIG. 4, the image processing apparatus 20 performs a normal morphing process on the parallelized original images A' and B' to generate an intermediate image C2' (S712). The image processing apparatus 20 further projects the intermediate image C2' back into a space before the parallelization using four points in the intermediate image C2' to generate an intermediate image C2 that should be naturally seen from the virtual viewpoint $P_C$ (S714 to S716). The view morphing process (S700) of FIG. 18 is discussed in detail below.

Figure 19:
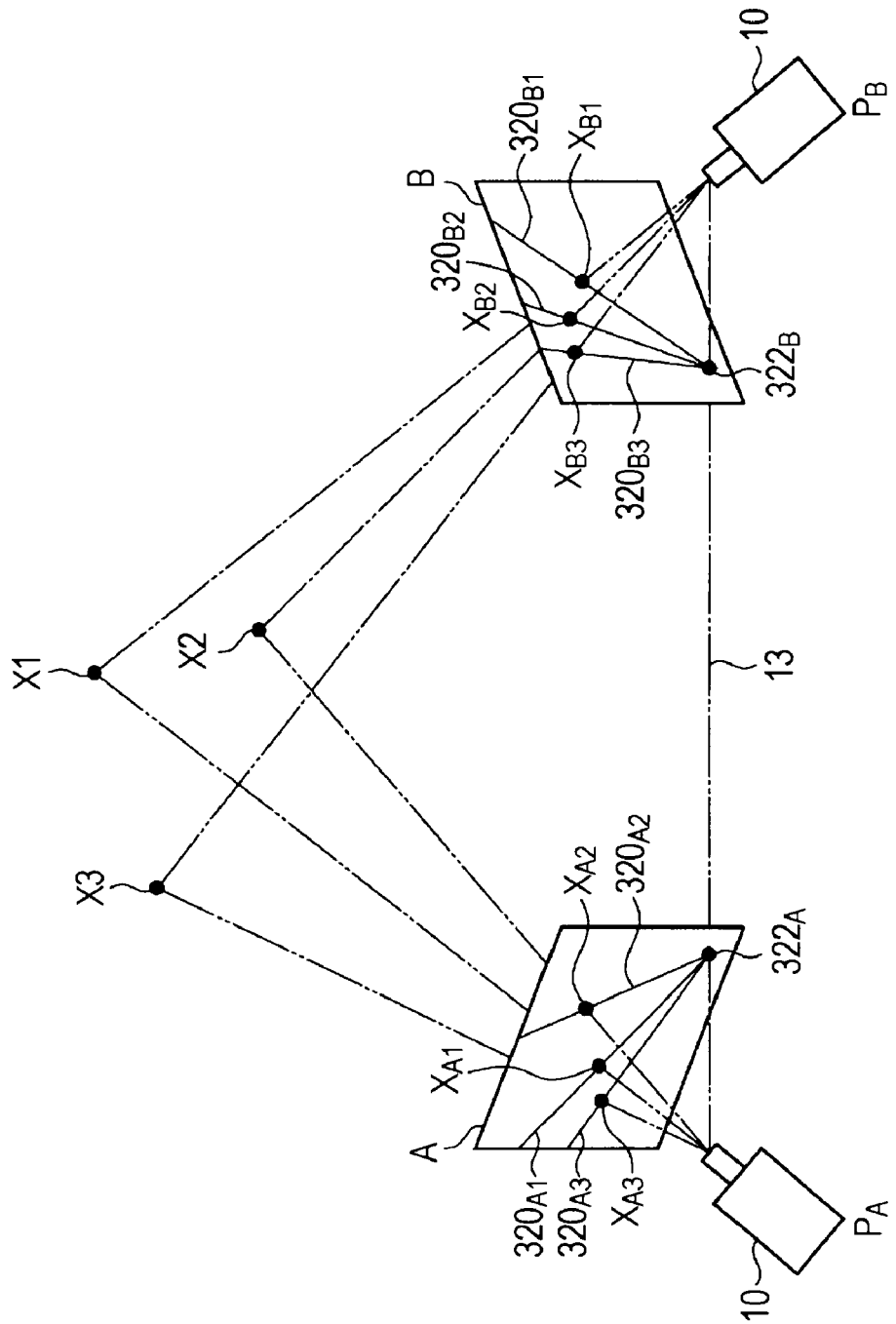
FIG. 19 shows the concept of the view morphing process according to the embodiment.

As shown in FIG. 18, the image processing apparatus 20 first estimates a fundamental matrix F for obtaining epipolar lines 320 (see FIG. 19) (S702). The fundamental matrix F is a matrix containing information representing relative relationship between the position and posture of the camera 10 at the viewpoint $P_A$ and the position and posture of the camera 10 at the viewpoint $P_B$, and is obtained from 8 sets or more of characteristic points $X_A$ and corresponding point $X_B$, for example. As shown in FIG. 19, the corresponding points $X_B$ in the original image B that correspond to the characteristic points $X_A$ in the original image A are located on an epipolar line $320_B$ of the original image B. A plurality of epipolar lines $320_A$, $320_B$ in the original image A, B pass though one epipole $322_A$, $322_B$.

A method for estimating the fundamental matrix F is described below. The fundamental matrix F satisfies the following formula (5).

$$x^T E x' = m^T F m'$$

$$F = A^{-T} E A'^{-1} = A^{-T} t \times R A'^{-1}$$

$$E = A^T F A'$$

$$eFm' = 0, \forall m'$$

$$F^T e = 0$$

$$Fe' = 0 \tag{5}$$

The parameters in the above formula (5) are as follows:

x: Coordinate of characteristic point $X_A$ in camera coordinate system at viewpoint $P_A$ x': Coordinate of corresponding point $X_B$ in camera coordinate system at viewpoint $P_B$ m: Coordinate of characteristic point $X_A$ in image coordinate system of camera at viewpoint $P_A$ m': Coordinate of corresponding point $X_B$ in image coordinate system of camera at viewpoint $P_B$ A: Internal parameter of camera at viewpoint $P_A$ A': Internal parameter of camera at viewpoint $P_B$ E: Elementary matrix F: Fundamental matrix t: Vector from viewpoint $P_A$ to viewpoint $P_B$ In estimating the fundamental matrix F, for example, the fundamental matrix F has a rank of 2 (3 translations and 3 rotations) and an arbitrary scale, and thus has 7 degrees of freedom overall. Thus, the fundamental matrix F may be calculated by a linear solution method when eight or more sets of characteristic points $X_A$ and corresponding points $X_B$ are obtained.

However, the thus calculated fundamental matrix F in general does not satisfy a condition that it has a rank of 2. Thus, a rank-2 matrix F' that is the closest to the fundamental matrix F calculated by a linear solution method is used as the final fundamental matrix. The fundamental matrix F is subjected to a singular value decomposition as given by the formula (6).

$$F = U \Sigma V^T \tag{6}$$

$\Sigma$: diagonal matrix of singular values ($\sigma_1 > \sigma_2 > \sigma_3$)

U, V: orthogonal matrix

In order to set the rank of the fundamental matrix to 2, the matrix F' is calculated using the following formula (7) with $\sigma_3 = 0$. The formula F' is then used as the final fundamental matrix.

$$F' = U \Sigma' V^T \tag{7}$$

$\Sigma'$: diagonal matrix of singular values ($\sigma_1 > \sigma_2 > \sigma_3$)

U, V: orthogonal matrix

A robust estimation may be utilized to estimate the fundamental matrix F. A robust estimation that uses RANSAC (Random Sampling Consensus) is performed in the following procedures (1) to (5). The RANSAC is effective in the case where some of the characteristic points are extreme outliers.

(1) Eight or more sets of characteristic points $X_A$ and $X_B$ are acquired by random sampling.

(2) A fundamental matrix is estimated from the eight or more sampled sets of characteristic points $X_A$ and $X_B$.

(3) An error is calculated for all the characteristic points $X_A$ and $X_B$ using the obtained fundamental matrix, and the number of the characteristic points $X_A$ and $X_B$, the error for which is a threshold or less, is used as the evaluation value of the fundamental matrix.

(4) The procedures (1) to (3) are repeated a sufficient number of times to obtain a fundamental matrix with the largest evaluation value.

(5) Characteristic points $X_A$ and $X_B$, the error of which with respect to the fundamental matrix with the largest evaluation value is the threshold or more, are determined to be outliners, and are excluded to determine the fundamental matrix F.

A robust estimation that uses LMeds (Least Median of Squares) is performed in the following procedures (1) to (5). The LMeds is effective in the case where the error range of the characteristic points is unclear.

(1) Eight or more sets of characteristic points $X_A$ and $X_B$ are acquired by random sampling.

(2) A fundamental matrix is estimated from the eight or more sampled sets of characteristic points $X_A$ and $X_B$.

(3) An error is calculated for all the characteristic points $X_A$ and $X_B$ using the obtained fundamental matrix, and the median of the errors is used as the evaluation value of the fundamental matrix.

(4) The procedures (1) to (3) are repeated a sufficient number of times to obtain a fundamental matrix with the largest evaluation value.

(5) Characteristic points $X_A$ and $X_B$, the error of which with respect to the fundamental matrix with the largest evaluation value is the threshold or more, are determined to be outliners, and are excluded to determine the fundamental matrix F.

The process for estimating the fundamental matrix F in S702 has been illustrated above.

Then, returning to FIG. 18, the image processing apparatus 20 obtains an epipole 322 of the original images A and B (S704) on the basis of eigenvalues and eigenvectors of the fundamental matrix F estimated in S702, and further obtains epipolar lines 320 (S706).

The image processing apparatus 20 further estimates a prewarping matrix on the basis of the epipole 322 obtained in S704 and the epipolar lines 320 obtained in S706 (S708). The following formula (8) represents the prewarping matrix.

$$H_0 = R_{\phi 0} R_{\theta 0}^{d_0}$$

$$H_1 = T R_{\phi 1} R_{\theta 1}^{d_1} \quad (8)$$

$R_{\phi i}^{di}$: a matrix that parallelizes the planes of the two original images A and B $R_{\phi i}$: a matrix that makes the epipolar lines of the two original images A and B parallel to each other T: a matrix that matches the height of the epipolar lines of the original image B with the height of the epipolar lines of the original image A The prewarping matrix of the formula (8) is obtained through calculations given by the following formulas (9) to (13).

$$e_0 = [e_0^x \, e_0^y \, e_0^z]^T$$

$$e_1 = [e_1^x \, e_1^y \, e_1^z]^T \quad (9)$$

$e_0, e_1$: coordinates of the epipole of the original images A and B $$d_0 = [-e_0^y \, e_0^x \, 0]^T \quad (10)$$
$$d_1 = [-y \, x \, 0]^T$$
$$[x \, y \, z]^T = F d_0$$

$$\theta_i = -\frac{\pi}{2} - \tan^{-1}\left(\frac{d_i^y e_i^x - d_i^x e_i^y}{e_i^z}\right) \quad (11)$$

$\theta_i$: a rotational angle that parallelizes the original images A and B to an identical virtual plane $$[\tilde{e}_i^x \, \tilde{e}_i^y \, 0]^T = R_{\theta_i}^{d_i} e_i$$

$$\phi_i = -\tan^{-1}(\tilde{e}_i^y / \tilde{e}_i^x) \quad (12)$$

$\theta_i$: a rotational angle that makes the epipolar lines in the original images A and B parallel to each other $$\tilde{F} = R_{\phi_1} R_{\theta_1}^{d_1} F R_{-\theta_0}^{d_0} R_{-\phi_0} = \begin{bmatrix} 0 & 0 & 0 \\ 0 & 0 & a \\ 0 & b & c \end{bmatrix} \quad (13)$$

$$T = \begin{bmatrix} 1 & 0 & 0 \\ 0 & -a & -c \\ 0 & 0 & b \end{bmatrix}$$

T: a matrix that matches the height of the epipolar line $320_A$ of the original image A with the height of the epipolar line $320_B$ of the original image B Then, as shown in FIGS. 2 and 3, the image processing apparatus 20 parallelizes (prewarps) the two original images A and B using the prewarping matrix obtained in S708 (S710). This makes the epipolar lines $320_A$ and $320_B$ of the two original images A and B parallel to each other.

Thereafter, as shown in FIG. 4, the image processing apparatus 20 performs a normal morphing process on the parallelized original images A' and B' to obtain an intermediate image C2' (S712). The image processing apparatus 20 then estimates a projective transformation matrix $H_3$ (postwarping matrix) using, for example, 4 points in the intermediate image C2' (S714). Further, as shown in FIG. 4, the image processing apparatus 20 projects the intermediate image C2' back into an image seen from the virtual viewpoint $P_C$ in a space before the parallelization using the projective transformation matrix $H_3$ to generate an intermediate image C2 seen from the virtual viewpoint $P_C$ (S716).

The view morphing process (S700) according to the embodiment has been described above. In the view morphing process, morphing is performed with a parallelization process performed on the original images A and B with consideration of camera geometry, and therefore calculation processes such as a matrix operation, a singular value decomposition, and a robust estimation described above are performed. Therefore, it is advantageously possible to generate an appropriate, distortion-free intermediate image C2 irrespective of the relative positional relationship between the camera 10 at the viewpoint $P_A$ and the camera 10 at the viewpoint $P_B$ in exchange of a high computational cost.

[4. Conclusion]

The image processing method performed by the image processing apparatus 20 according to the embodiment has been described above. As described above, the view morphing process (S700) with consideration of camera geometry provides a distortion-free intermediate image C2, but involves processes with a high computational cost such as a robust estimation and a singular value decomposition, for example.

Thus, the image processing apparatus 20 according to the embodiment detects a straight edge 310 in the original image A (S300), and detects distortion of a corresponding edge 312 in an intermediate image C3 (binary image) generated by a normal morphing process (S500) that corresponds to the straight edge 310 (S600). Only in the case where the corresponding edge 312 is found to be distorted as a result of the detection, the image processing apparatus 20 further executes a view morphing process (S700) to generate a distortion-free intermediate image C2. In the case where the corresponding edge 312 is found to be not distorted, on the other hand, the image processing apparatus 20 outputs an intermediate image C1 generated by a normal morphing process (S400) without executing a view morphing process (S700).

In the embodiment, as described above, the normal morphing process (S400) and the view morphing process (S700) are appropriately switched depending on the presence or absence of distortion of the corresponding edge 312 in the binarized intermediate image C3. Consequently, the view morphing process (S700) is not performed on all the input images (original images A and B), and only the normal morphing process (S400) is performed on images in which the intermediate image C1 is not distorted after the normal morphing process (400). Thus, it is possible to generate a natural and distortion-free intermediate image C from the original images A and B captured at the two viewpoints $P_A$ and $P_B$, irrespective of the relative positional relationship between the camera 10 at the viewpoint $P_A$ and the camera 10 at the viewpoint $P_B$. In addition, it is possible to significantly reduce the overall computational cost by reducing the number of executions of the view morphing process (S700) with a high computational cost as much as possible. The approach according to the embodiment is particularly effective in the case where a morphing technology is implemented on electronic devices equipped with a processor with a low processing capacity (for example, portable devices such as digital cameras).

Second Embodiment

Figure 20:
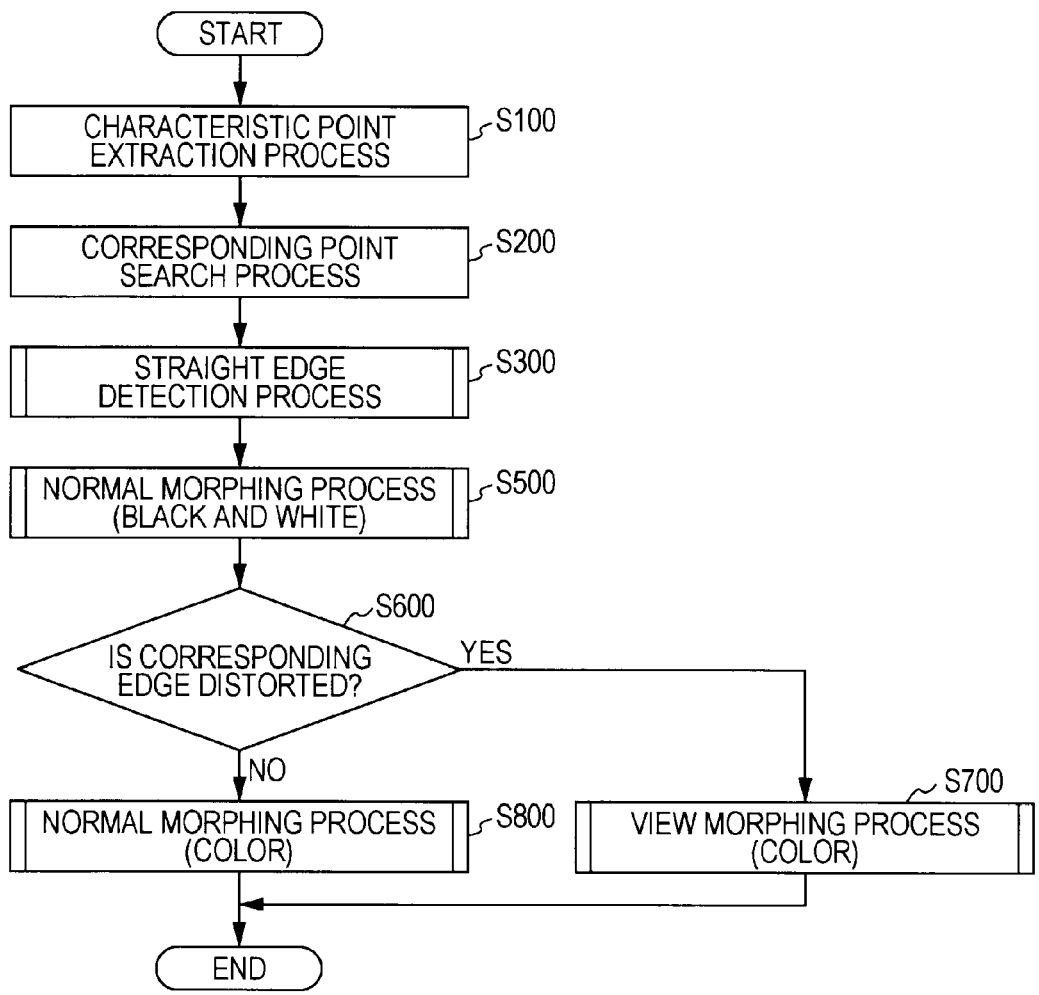
FIG. 20 is a flowchart showing an image processing method according to a second embodiment of the present invention.

Now, an image processing method performed by an image processing apparatus 20 according to a second embodiment of the present invention will be described with reference to FIG. 20. FIG. 20 is a flowchart showing the image processing method according to the second embodiment. The image processing method according to the second embodiment is different from the image processing method according to the first embodiment (see FIG. 7) in timing at which the normal morphing process (color image) is executed. Other functional configurations of the second embodiment are substantially the same as those of the first embodiment, and thus are not described in detail.

In the image processing method according to the second embodiment, as shown in FIG. 20, a characteristic point extraction process (S100) and a corresponding point search process (S200) are first performed on original images A and B, after which a straight edge detection process (S300) is performed on the original image A. Then, a normal morphing process is performed on the binarized original images A and B to generate an intermediate image C3 (binary image) (S500).

Thereafter, it is detected whether or not a corresponding edge 312 in the intermediate image C3 is distorted (S600). If the corresponding edge 312 is found to be distorted as a result of the detection, a view morphing process (S700) is executed on the original images A and B to generate an intermediate image C2 (color image). If the corresponding edge 312 is found to be not distorted, on the other hand, a normal morphing process (S800) is executed on the original images A and B to generate an intermediate image C1 (color image). The normal morphing process (S800) of FIG. 20 is the same as the normal morphing process (S400) according to the first embodiment.

In the second embodiment, as described above, distortion of the corresponding edge 312 in the intermediate image C3 (binary image) generated by the normal morphing process (S500) is first detected, and one of the view morphing process (S700) and the normal morphing process (S800) is selectively executed depending on the presence or absence of such distortion. Consequently, it is possible to further reduce the computational cost in the second embodiment compared to the first embodiment.

That is, in the first embodiment shown in FIG. 7, the normal morphing process (S400) for color images and the normal morphing process (S500) for binary images are performed before the distortion detection process (S600) is performed. In this flow, in the case where distortion is detected in the intermediate image C3 in the distortion detection process (S600), the view morphing process (S700) is performed and thus the normal morphing process (S500) which has already been performed becomes useless.

In the second embodiment shown in FIG. 20, in contrast, the normal morphing process (S500) for binary images and the distortion detection process (S600) are performed without performing the normal morphing process for color images, and the normal morphing process (S800) for color images is performed for the first time in the case where the intermediate image C3 is not distorted. In the case where the intermediate image C3 is distorted, on the other hand, only the view morphing process (S700) is performed without performing the normal morphing process (S800) for color images. In the second embodiment, hence, it is possible to save uselessly executing the normal morphing process (S800) for color images in the case where the intermediate image C3 is distorted, which reduces the computational cost necessary for the normal morphing process (S800) compared to the first embodiment.

The present application contains subject matter related to that disclosed in Japanese Priority Patent Application JP 2009-133404 filed in the Japan Patent Office on Jun. 2, 2009, the entire content of which is hereby incorporated by reference.

While a preferred embodiment of the present invention has been described in detail with reference to the accompanying drawings, the present invention is not limited thereto. It is apparent to those having an ordinary knowledge in the art to which the present invention belongs that various changes and modifications may be made without departing from the technical spirit of the appended claims. It is understood as a matter of course that such changes and modifications should be construed as belonging to the technical scope of the present invention.

What is claimed is:

1. An image processing apparatus, comprising:
    a straight edge detection section that detects a straight edge of an object in at least one of first and second original images obtained by capturing the identical object from two different viewpoints;
    a first morphing processing section that performs a first morphing process, in which a parallelization process is not performed on the first and second original images, on the first and second original images to generate a first intermediate image seen from a virtual viewpoint between the two viewpoints;

a distortion determination section that determines whether or not an edge of the object in the first intermediate image that corresponds to the straight edge detected by the straight edge detection section is distorted; and a second morphing processing section that, if the edge is distorted, performs a second morphing process, in which a parallelization process is performed on the first and second original images, on the first and second original images to generate a second intermediate image seen from the virtual viewpoint, wherein the straight edge detection section binarizes the at least one of the original images and performs expansion and contraction processes on the binarized image to detect the straight edge from the image that has been subjected to the expansion and contraction processes using a Hough transform.

2. An image processing apparatus, comprising:

a straight edge detection section that detects a straight edge of an object in at least one of first and second original images obtained by capturing the identical object from two different viewpoints;

a first morphing processing section that performs a first morphing process, in which a parallelization process is not performed on the first and second original images, on the first and second original images to generate a first intermediate image seen from a virtual viewpoint between the two viewpoints;

a distortion determination section that determines whether or not an edge of the object in the first intermediate image that corresponds to the straight edge detected by the straight edge detection section is distorted; and a second morphing processing section that, if the edge is distorted, performs a second morphing process, in which a parallelization process is performed on the first and second original images, on the first and second original images to generate a second intermediate image seen from the virtual viewpoint, wherein the distortion determination section determines that the edge in the first intermediate image is distorted if an area of an image region surrounded by the edge and a line segment connecting both ends of the edge is equal to or more than a threshold determined by a predetermined determination criterion constant.

3. The image processing apparatus according to claim 1, wherein the second morphing process is a view morphing process.

4. An image processing method comprising:

detecting, by an image processing apparatus, a straight edge of an object in at least one of first and second original images obtained by capturing the identical object from two different viewpoints;

performing, by an image processing apparatus, a first morphing process, in which a parallelization process is not performed on the first and second original images, on the first and second original images to generate a first intermediate image seen from a virtual viewpoint between the two viewpoints;

determining, by an image processing apparatus, whether or not an edge of the object in the first intermediate image that corresponds to the straight edge detected in the detecting a straight edge is distorted; and if the edge is distorted, performing a second morphing process, in which a parallelization process is performed on the first and second original images, on the first and second original images to generate a second intermediate image seen from the virtual viewpoint, wherein the detecting a straight edge includes binarizing the at least one of the original images and performing expansion and contraction process on the binarized image to detect the straight edge from the image that has been subjected to the expansion and contraction process using a Hough transform.

* * * * *